United States Patent [19]

Roberts et al.

[11] Patent Number: 5,659,567

[45] Date of Patent: Aug. 19, 1997

[54] MICROWAVE-DRIVEN UV LIGHT SOURCE AND SOLID-STATE LASER

[76] Inventors: Rosemary Szewjkowski Roberts, 506 Laurel Dr., Columbia, Mo. 65203; David James Mencin, 15732 Hillhouse Rd., Chesterfield, Mo. 63017; Mark A. Prelas, 506 Laurel Dr., Columbia, Mo. 65203

[21] Appl. No.: 108,996

[22] Filed: Aug. 18, 1993

Related U.S. Application Data

[63] Continuation-in-part of Ser. No. 837,733, Feb. 19, 1992, Pat. No. 5,239,551.

[51] Int. Cl.$^6$ .................................................. H01S 3/097
[52] U.S. Cl. ............................ 372/82; 372/69; 372/57; 372/39; 372/98
[58] Field of Search ............................ 372/82, 69, 39, 372/57, 88

[56] References Cited

U.S. PATENT DOCUMENTS

| | | | |
|---|---|---|---|
| 4,382,656 | 5/1983 | Gilby | 350/96.28 |
| 4,485,332 | 11/1984 | Ury et al. | 315/112 |
| 4,496,211 | 1/1985 | Daniel | 350/96.2 |
| 4,507,587 | 3/1985 | Wood et al. | 315/39 |
| 4,697,867 | 10/1987 | Blanc et al. | 350/96.1 |
| 4,730,882 | 3/1988 | Messerschmidt | 350/96.1 |
| 4,930,863 | 6/1990 | Croitoriu et al. | 350/96.32 |
| 4,932,749 | 6/1990 | Haidle et al. | 350/96.32 |
| 4,955,035 | 9/1990 | Gekat | 372/69 |
| 5,114,661 | 5/1992 | Prelas | 376/146 |
| 5,239,551 | 8/1993 | Roberts et al. | 372/57 |

OTHER PUBLICATIONS

Stephen Offermanns, Electrodeles high pressure microwave discharges Jan. 1990 pp. 115–123.
Hiroshi Kumagai & Minoru Obara Newhigh–efficiency quasi–continuous operation of a KrF (B–e) excimer lamp excited by microwave discharge, Jun. 1989 pp. 2619–2621.
Prelas, Boody, Miley & Kunze, Nuclear driven flash lamps Mar. 1987 pp. 25–62.
Abstract Submitted for the 23rd Annual Meeting, Division of Plasma Physics, Mark A. Prelas John Haman & Hee Chung Park.
Jes Asmussen, Jr. Raghuveer Mallavarpu The Design of a Microwave Plasma Cavity Jan. 1974 pp. 109–117.
H.P. Stormbergand, R. Schafer Time–dependent behavior of high–pressure Mercury Discharges, Aug. 1983 pp. 4338–4347.
University of Missouri Press Release Clipping Brookfield, MO Circ. 538 Jan. 26, 1982; Clipping Joplin MO Circ 40352 Jan. 31, 1982; Clipping Boonville MO Jan. 21, 1982.

*Primary Examiner*—Leon Scott, Jr.
*Attorney, Agent, or Firm*—Heller & Kepler

[57] ABSTRACT

A solid-state lasers and method of operating the laser is described having a microwave-driven (MWD) visible excimer fluorescence source for exciting a solid-state laser. The laser of this invention provides an efficient, compact, and tunable solid-state laser preferably for use with tunable vibronic laser crystals. Further described is an excimer lamp that has the capability of provided illumination at varying wavelengths. In one embodiment an excimer is selected in a desire to maximize light absorption in plants. This is accomplished by tuning the lamp to provide an output compatible with plant chlorophyll.

15 Claims, 12 Drawing Sheets

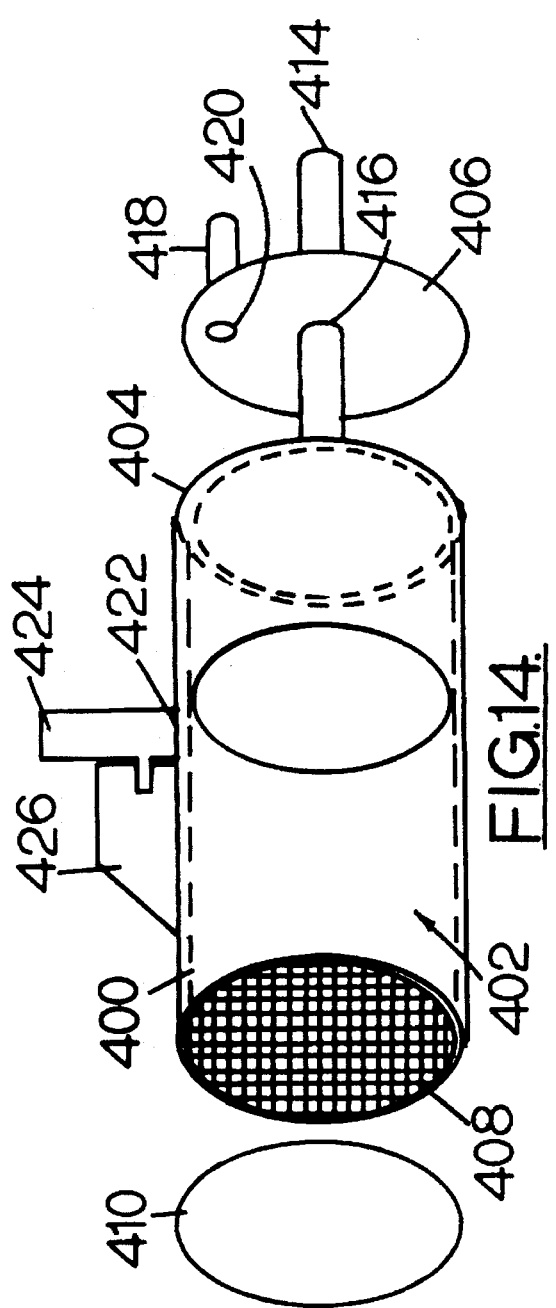
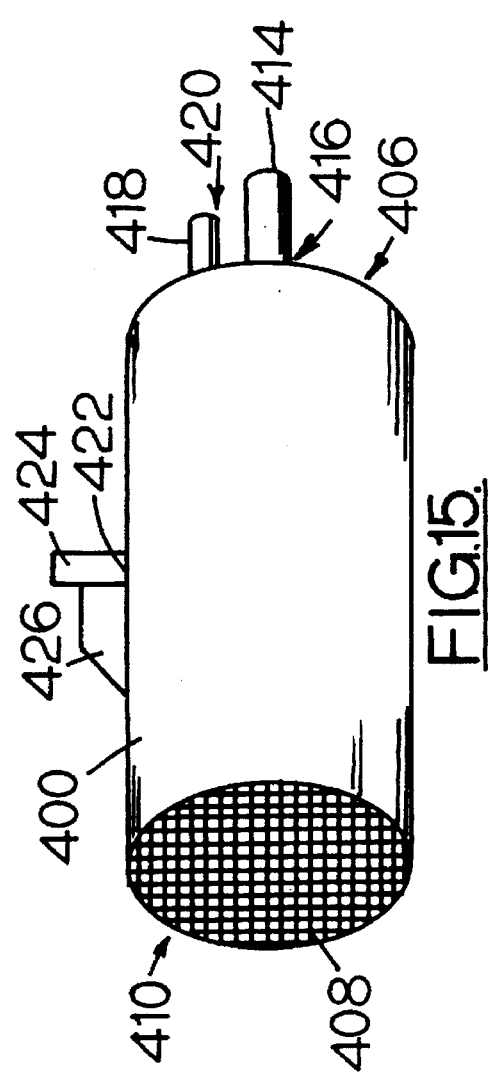

MERCURY EXCIMER SPECTRA

Theoretical Maximum Excimer Fluorescence Efficiencies

| Excimer | λ (nm) | $\eta_{max}$ | Excimer | λ (nm) | $\eta_{max}$ |
|---|---|---|---|---|---|
| NeF* | 108 | 0.43 | XeCl* | 308 | 0.27 |
| Ar$_2$ | 129 | 0.50 | I$_2$ | 343 | 0.24 |
| Kr$_2$ | 147 | 0.47 | XeF* | 346 | 0.24 |
| F$_2$ | 158 | 0.44 | Kr$_2$F* | 415 | 0.17 |
| Xe$_2$ | 172 | 0.48 | Na$_2$* | 437 | 0.46 |
| ArCl* | 175 | 0.48 | HgI* | 443 | 0.19 |
| KrI* | 185 | 0.37 | Li$_2$* | 459 | 0.42 |
| ArF* | 193 | 0.35 | HgBr* | 502 | 0.17 |
| KrBr* | 206 | 0.33 | (Xe,Ar,Kr)O* | 547 | 0.15 |
| KrCl* | 222 | 0.31 | HgCl* | 558 | 0.15 |
| KrF* | 249 | 0.28 | K$_2$* | 575 | 0.42 |
| XeI* | 253 | 0.37 | Rb$_2$* | 605 | 0.41 |
| Cl$_2$ | 258 | 0.32 | CdI* | 655 | 0.13 |
| XeBr* | 282 | 0.29 | Cs$_2$* | 713 | 0.37 |
| Br$_2$ | 290 | 0.29 | CdBr* | 811 | 0.10 |

FIG.22.

MICROWAVE-DRIVEN UV LIGHT SOURCE AND SOLID-STATE LASER

CROSS-REFERENCE TO RELATED APPLICATION

This application is a continuation-in-part of application Ser. No. 07/837,733, filed Feb. 19, 1992, now U.S. Pat. No. 5,239,551, issued Aug. 24, 1993.

STATEMENT OF RELATED GOVERNMENT CONTRACT

The following solid-state laser device has been developed under Government Contract #DAAA15-90-C-0016, in association with the U.S. Department of Defense, and the SBIR Program. Subsequent work on the following microwave-driven light source was pursued with private funds.

BACKGROUND OF THE INVENTION

The present invention relates in general to solid-state lasers and pertains, more particularly, to a microwave-driven (MWD) UV solid-state laser. The laser of this invention provides an efficient, compact, and tunable solid-state laser and is an improvement over the conventional microwave-driven solid-state laser.

The present invention further relates in general to a UV light source, and more particularly to a microwave driven excimer light lamp.

With conventional solid-state lasers it is generally necessary to provide a broadband source, such as high-pressure, and high-current rare gas flashlamps for pumping solid-state lasers. This approach can be traced to the initial demonstration of an operable ruby laser in 1960.

In theory, broadband sources should radiate the majority of their energy in the visible to near infra-red. However, the plasma that is produced is optically thick for visible to infra-red transmissions due in part to self-absorption and Doppler and pressure broadening. Other drawbacks are well known for the conventional broad-band sources and their various applications.

Narrow-band sources are known as drivers for solid-state lasers. One application of a narrow-band source is the use of a frequency doubled Nd:YAG laser or a dye laser as an excitation source to drive a tunable Ti:Al$_2$O$_3$ laser. Another example of the use of a narrow-band source are the 50% to 60% efficient narrow-band semi-conductor lasers which emit at approximately 810 nm, coupled with fiber optics or coupled to the side of a Nd:YAG rod.

Another drawback associated with the narrow-band semi-conductor lasers is an overall efficiency of converting heat to 810 nm light of only 20%, approximately. Although this is considered relatively efficient, the single semi-conductor lasers will be likely to produce more than 100 milliwatts of continuous power or less.

Therefore, a solid-state laser such as Nd:YAG in which the coupling of the 810 nm light is assumed to be 40% efficient, and which has a 50% efficiency of converting absorbed fluorescence into laser photons, would require at a minimum an array of fifty (50) semi-conductor lasers to produce each watt of solid-state laser output.

Conventional UV sources, for use as a light source and for a laser and other applications are also inefficient and therefore costly to operate. Further, conventional light sources do not include waveguides, and are typically limited to strictly UV ranges.

It is expected that high average power, narrow band photon sources, if available, would have a number of commercial applications. High average power, narrow band photon sources can be categorized as either lamps (incoherent) or lasers (coherent). Lamps can be either continuum or line and can produce large quantities of light with good efficiency and are relatively inexpensive.

One drawback is that lamps produce substantially lower intensities than lasers and are generally an overall less efficient device due to poor geometric coupling due to the incoherent quality of the light and, more particularly, because of their broadband emission spectra. Another drawback is the potentially detrimental heating from the lamp due to the light produced at wavelengths other than those required by a specific commercial process at the absorption band of the commercial process to which the lamp is applied.

It is known to select and use laser sources, for example, diode, dye, and other solid-state lasers, to closely match an absorption band of a specific commercial process. Thus, the photons are used efficiently, heating is minimized, and geometric coupling is accomplished more efficiently since the laser output is coherent.

Lasers have a number of drawbacks due to the generally accepted expense of lasers, their known inefficiencies (possibly excluding diode lasers from this category), and their inability to produce large amounts of average power. It will be recognize, therefore, that lasers are not currently usable for any number of commercial applications.

Thus, if efficient, narrow band lamps could be made available, then they would provide a relatively inexpensive source of photons for commercial lamp applications. Conventional lamps are recognized to have a number of drawbacks. Existing conventional lamps have substantial problems with efficiency and broad band emission.

All known existing lamps are variations of the two basic types of lamps and generally operate as either electrical discharge lamps or hot wire thermal radiators. Hot wire thermal radiators produce a "black body" continuum. The "black body" continuum is determined by the temperature of the wire.

Electrical discharge lamps typically utilize rare gasses or metal vapors, for example, Hg or Na. Electrical discharge lamps produce line or continuum spectra which depends on pressure, temperature, and discharge power density. Electrical discharge lamps are inherently inefficient for commercial processes with narrow absorption bands because of the limited overlap between emission and absorption spectra.

It is believed that much higher efficiencies could be obtained if a lamp's emission could be limited to the absorption band or bands of the specific commercial process. Unfortunately, another drawback associated with known line radiator lamps is the relatively low power and/or inefficiency. For example, if the transition is between excited states, i.e., rare gas line radiators, the lamp is inefficient because the excitation energy is much greater that the photon energy.

If the transition is to a ground state as is the case for Hg and Na lamps, then the lamp can be efficient because the photon energy can be a significant fraction of the excitation energy. However, these lamps are limited to low pressures, small sizes, and low excitation power densities. The lamps are thereby limited to low output power.

Another drawback with these lamps is that at high pressures or for large volumes, the high optical density of the lamp causes the emitted radiation to be self-absorbed. The self-absorbed radiation will be re-emitted but with the loss of the line nature of the emission. This is due to significant broadening of the line as is observed for high pressure Na and Hg lamps.

If high power is attempted from a small volume with a line radiator-type lamp, then the high temperatures, pressures, and electron densities produced broaden the line or lines. The line or lines broaden until the lamp becomes a continuum radiator. This is the case for high power rare gas .discharge lamps.

SUMMARY OF THE INVENTION

Accordingly, it is an object of the present invention to provide an improved MWD UV solid-state laser that is adapted to increase the efficiency, compactness, and tunability of the laser. With the MWD UV solid-state laser of this invention it is believed that it will be possible to construct a relatively light and compact cell from a pair of lamps arranged on either side of a laser media.

Another object of the present invention is to provide an improved MWD UV solid-state laser that is constructed to provide a pump photon source which produces photons that overlap the absorption band-width of vibronic crystals for tunable lasers.

A further object of the present invention is to provide an improved MWD UV solid-state laser that is adapted for the utilization of a microwave driven excimer lamp incorporating an excimer fluorescer.

Still another object of the present invention is to provide a MWD UV solid-state laser that may incorporate MWD excimer lamp which can pump one or more of the family of the vibronic lasers.

Still a further object of the present invention is to provide an improved MWD UV solid-state laser that is adapted for large volume, low power density, and narrow-band operation. The MWD UV solid-state laser of this invention is characterized by harnessing a narrow-band fluorescence source for driving solid-state lasers.

Another object of the present invention is to provide a MWD UV solid-state laser that contains a visible excimer fluorescer in a resonance cavity. The cell construction couples the resonance cavity with the excimer gases to provide excitation of an optically coupled laser media with the fluorescence sources.

A further object of the present invention is to provide a MWD UV solid-state laser lamp with a microwave resonance cavity that includes optical concentration and to then transport the excimer fluorescence to the solid-state laser media.

Still another object of the present invention is to provide a MWD UV solid-state laser that is operable as a high frequency device in one configuration and as a low frequency device in another configuration.

Still a further object of the present invention is to provide a MWD UV solid-state laser using optically concentrated visible excimer fluorescers driven with relatively large volume, low power density gas discharges.

Yet a further object of the present invention is to provide a high energy light source which can be used to produce emissions in wavelengths from vacuum ultraviolet through ultraviolet to the visible.

Another object of the present invention is to provide a high energy light source which is energy efficient and economical to operate.

Still another object of the present invention is to provide a high energy light source utilizing a narrow band fluorescer.

Yet another object of the present invention is to provide a high energy light source utilizing an excimer fluorescer.

A further object of the present invention is to provide a high energy light source utilizing a microwave driven excimer fluorescer which is sufficiently efficient to provide an economical high energy source for commercial or experimental processes.

Still another object of the present invention is to provide a high energy light source to produce high average power, narrow band photon sources efficiently and affordably.

To accomplish the foregoing and other objects of this invention there is provided a MWD UV solid-state laser for generating a desired emission from the solid-state laser media with excimer fluorescence excited by a microwave source, concentrated, and subsequently transported to the solid-state laser media. A narrow-band visible excimer fluorescer is contained and excited to produce an excimer fluorescence that is optically concentrated and subsequently transported to a solid-state laser media.

Preferred embodiments of the solid-state laser include the use of various laser media. The laser media will have an absorption band compatible with the emission wavelength of the excimer fluorescence and will be capable in some instances of being frequency doubled and tripled.

A variety of narrow band excimer fluorescer sources should provide suitable excimer photon sources. Theoretically, the solid-state laser should be capable of operating With a narrow band fluorescer source having an emission wavelength from approximately 400 nm to approximately 700 nm, inclusive.

In a preferred embodiment a microwave source excites a narrow-band visible excimer fluorescence contained in a microwave resonance chamber. The fluorescer material is circulated through the chamber as a plasma.

In an alternative embodiment, the UV light source described above is constructed for use as a light source in various applications. These uses of high energy light are well known in the various arts, however, use of the improved UV source of the present invention will greatly increase efficiency of these applications.

High intensity, efficient, narrow band light sources of lamps are useful for a number of commercial or experimental processes. It is known to use light for inducing biological, chemical, and physical changes.

The uses of UV radiation include sterilization of water and surfaces, breaking chemical bonds, and photochemical synthesis as discussed by C. von Sonntag in *Disinfection with UV Radiation*, in *Process Technologies for Water Treatment*, pages 159–179, S. Stucki, Ed., Plenum Press, New York (1988).

Another use includes UV induced initiation of free radical reactions in photopolymerization, also know as UV curing as discussed by J. Decker in *Coatings Technology*, pages 59, 97–106 (1987).

New applications are being developed using UV surface modifications in the area of coatings. For example, it is know to use UV for the following modifications: paints, adhesives and plastics.

Additional developments for the use of UV excimer lamps are curing insulation and conductive layers on printed circuit boards as discussed by W. F. A. Su, J. D. B. Smith, and A. H. Long in *Sampe J.* 24, 27–32 (1988).

UV processes may also be used for micro-machining either by bond-breaking or by reactive etching and oxidation as discussed by U. Kogelschatz in various 1989 published papers and articles.

It is also known to use UV light for the photo-dissociation of an organometallic and it is believed that the lamp of the present invention will be suitable for this use as well.

UV induced processes are under study and have been discussed for the patterned deposition and removal of dielectric and metal layers on printed circuit boards and microcircuits.

It is also known to deposit films of special mechanical, chemical, optical, or magnetic properties. This is discussed by H. Esrom, G. Jo Wahl, and U. Kogelschatz (1989).

The preferred embodiments for the solid-state laser and the method of operating the laser that are predicted from the work done during the above-identified contracts and programs are discussed in detail below and these and other objects and features of the present invention will be better understood and appreciated from the following detailed description of the following embodiments thereof, selected for purposes of illustration and shown in the accompanying drawings.

The present invention, however, relates to preferred embodiments of the UV light source or lamp and the method of operation.

BRIEF DESCRIPTION OF THE DRAWINGS

High Frequency

Low Frequency

Figure 5:
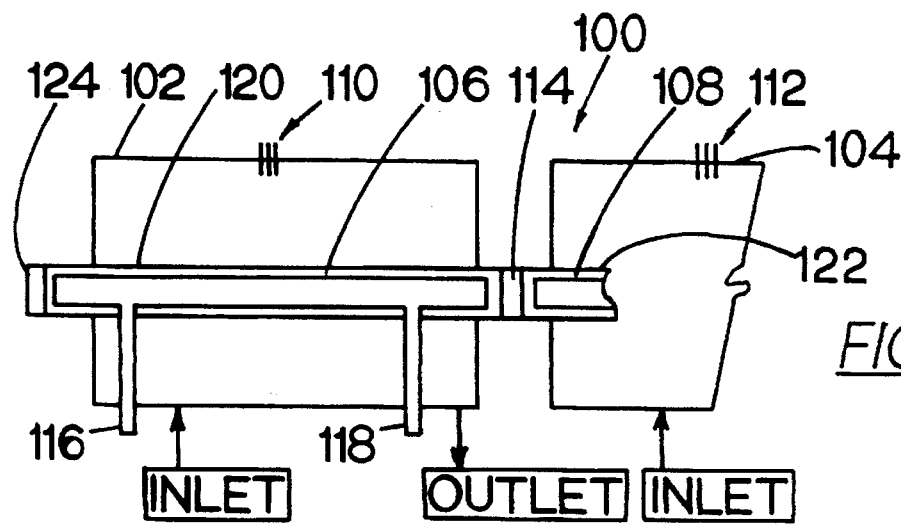
Figure 6:
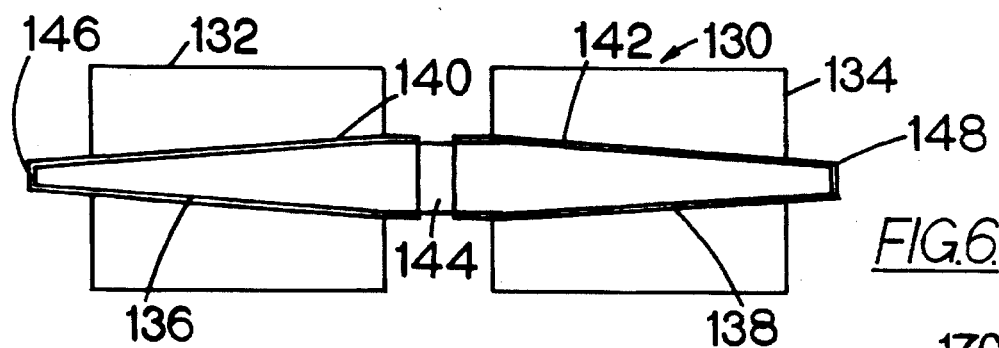
Figure 7:
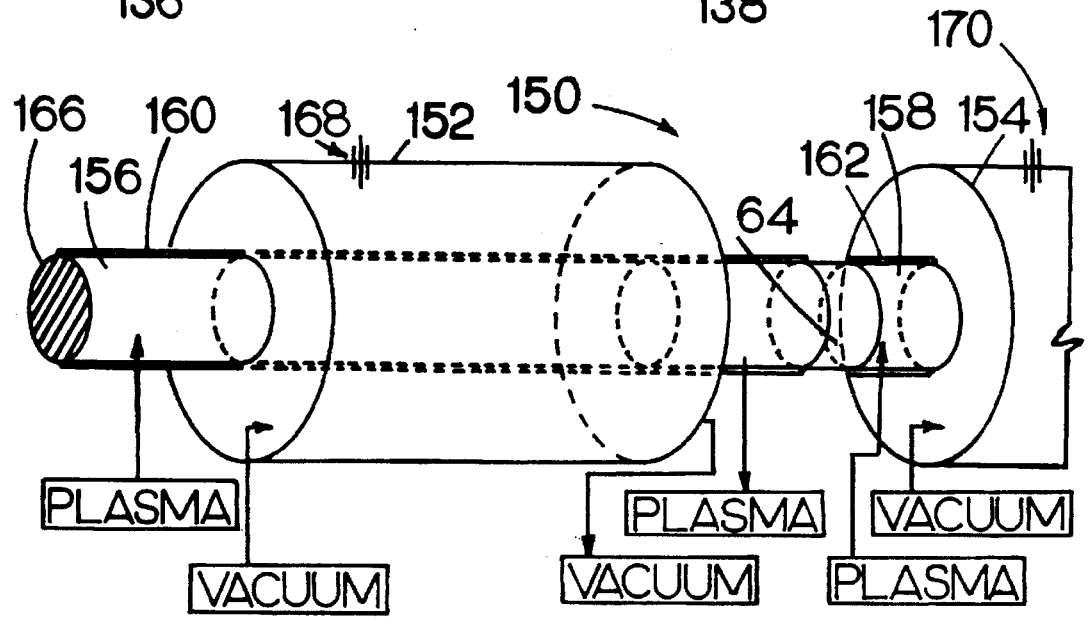
Figure 8:
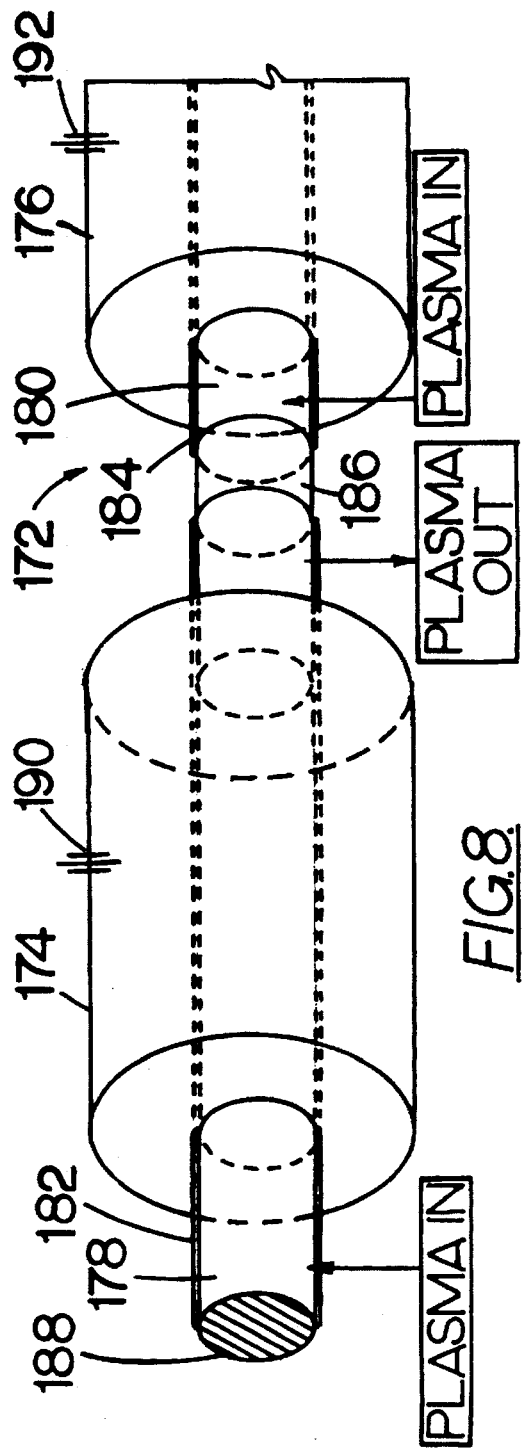
Figure 9:
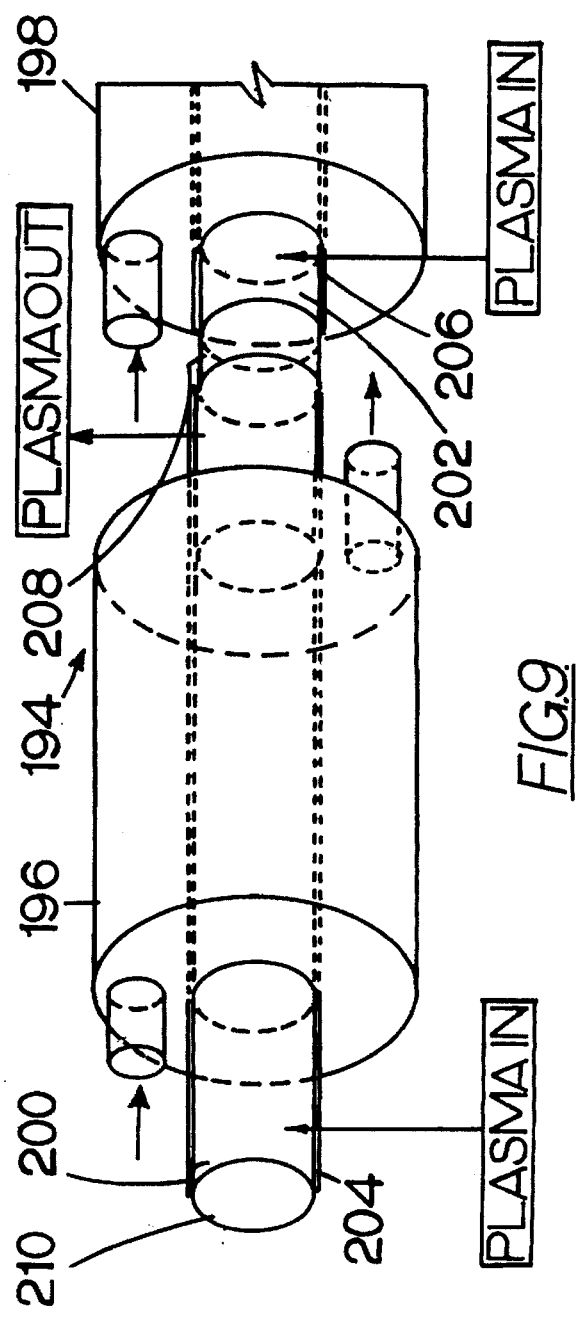
Figure 10:
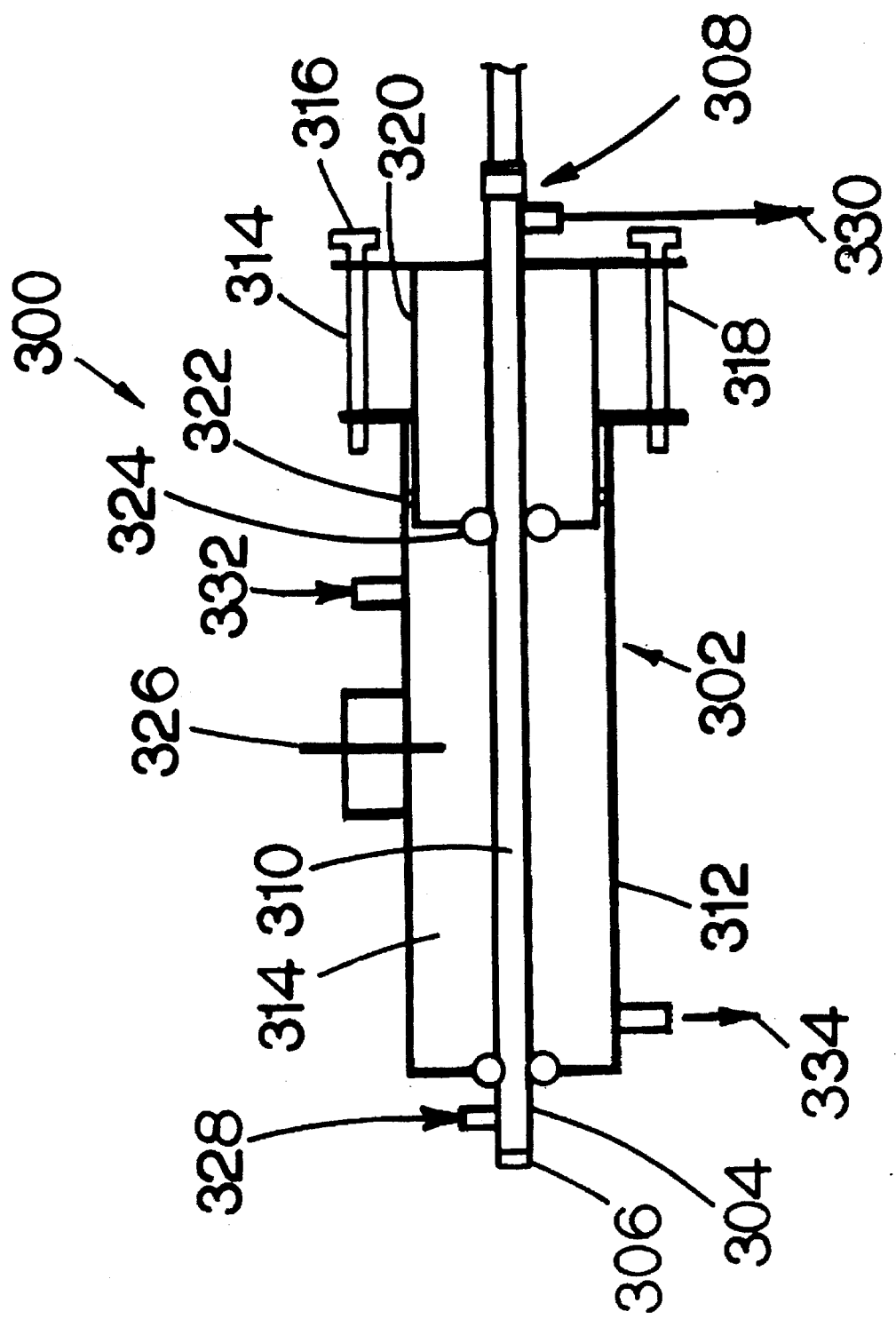

FIG. 5 is a diagram of another embodiment of a MWD UV solid-state laser fashioned in accordance with the present invention;

FIG. 6 is a diagram of another embodiment of a MWD UV solid-state laser fashioned in accordance with the present invention, primarily illustrating a conical embodiment;

FIG. 7 is a diagram of another embodiment of a MWD UV solid-state laser fashioned in accordance with the present invention;

FIG. 8 is a diagram of another embodiment of a MWD UV solid-state laser fashioned in accordance with the present invention;

FIG. 9 is a diagram of another embodiment of a MWD UV solid-state laser fashioned in accordance with the present invention; and FIG. 10 is a diagram of another embodiment of the present invention;

Diagrams

Figure 11:
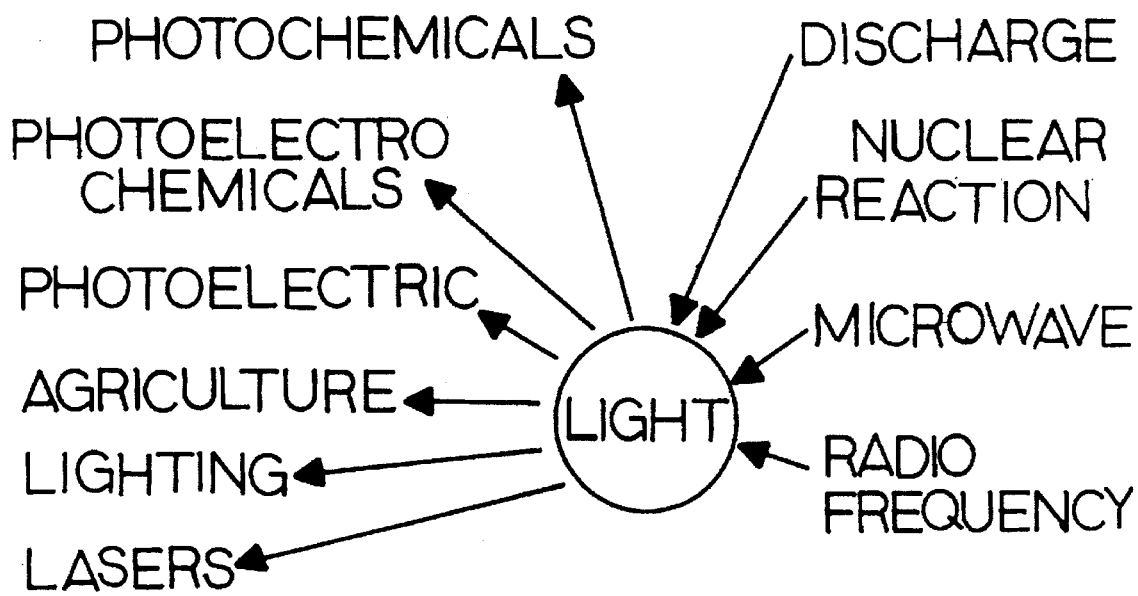
Figure 13:
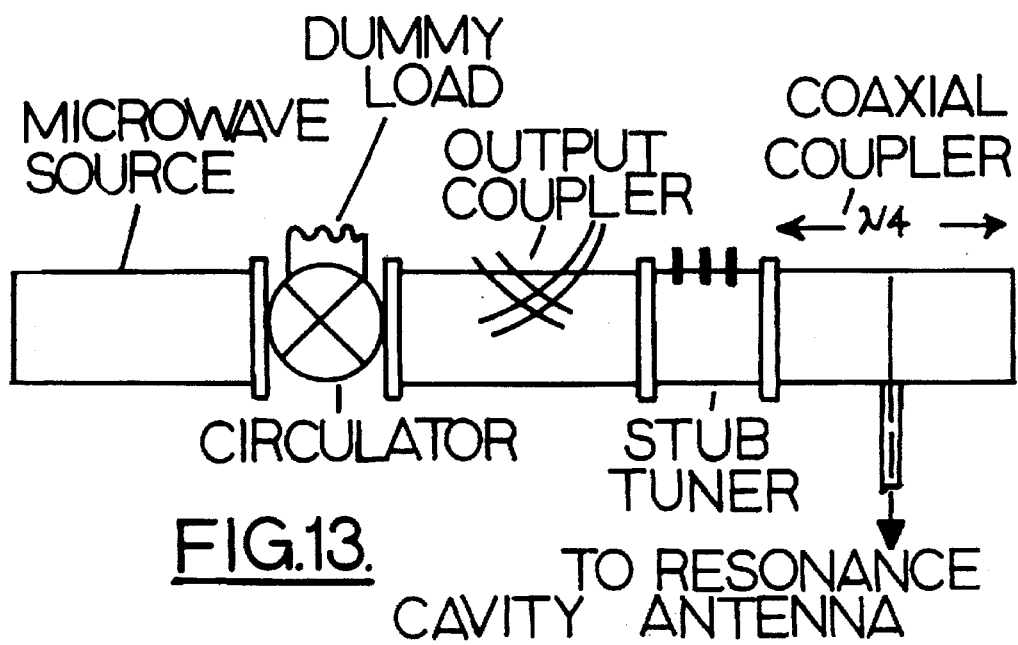
Figure 12:
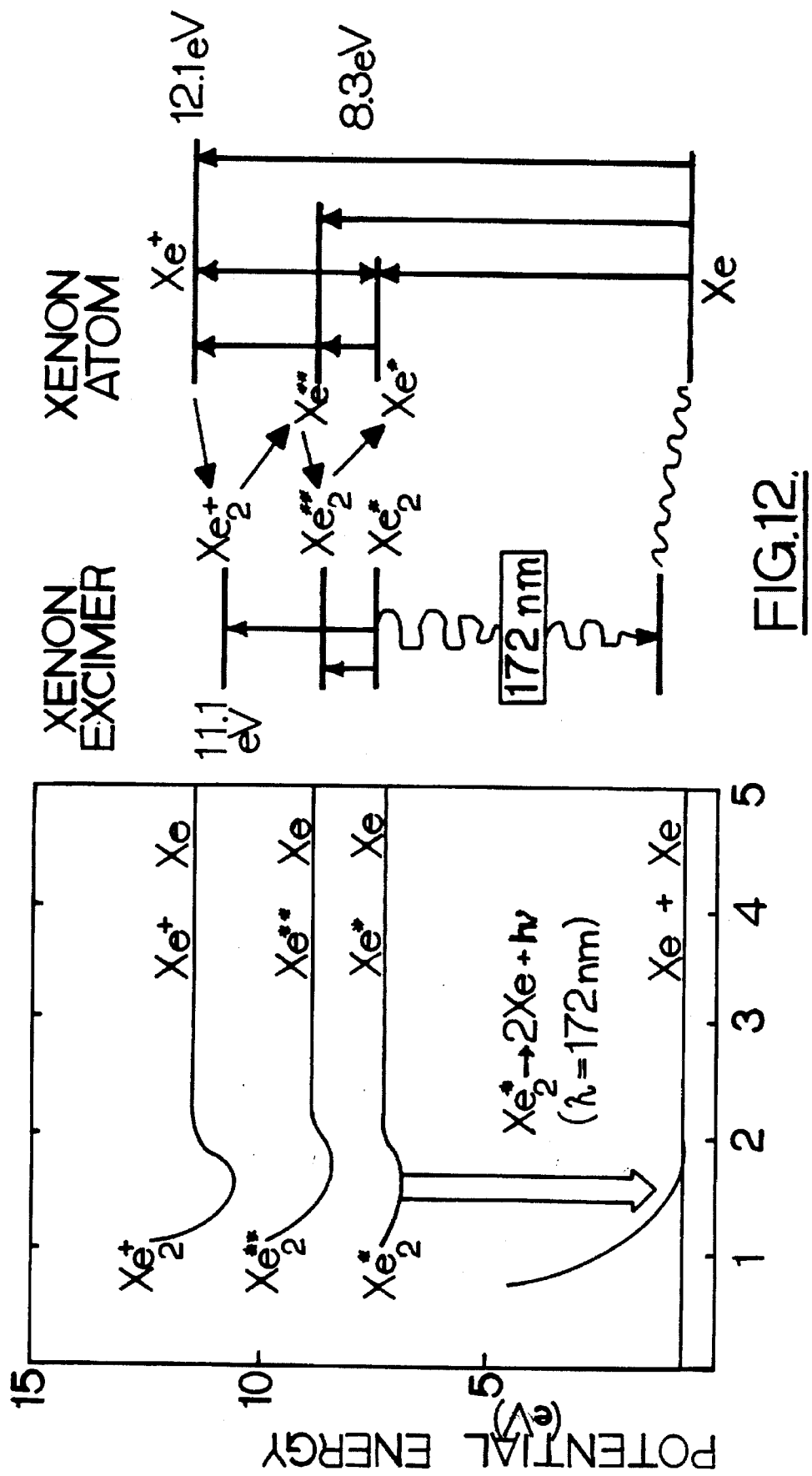

FIG. 11 is a diagram of the optical trapping effect;

FIG. 12 is a diagram of energy flow with an excimer system which has a rare gas species;

FIG. 13 is a diagram of an impedance matching microwave circuit;

UV Light Source

Figure 16:
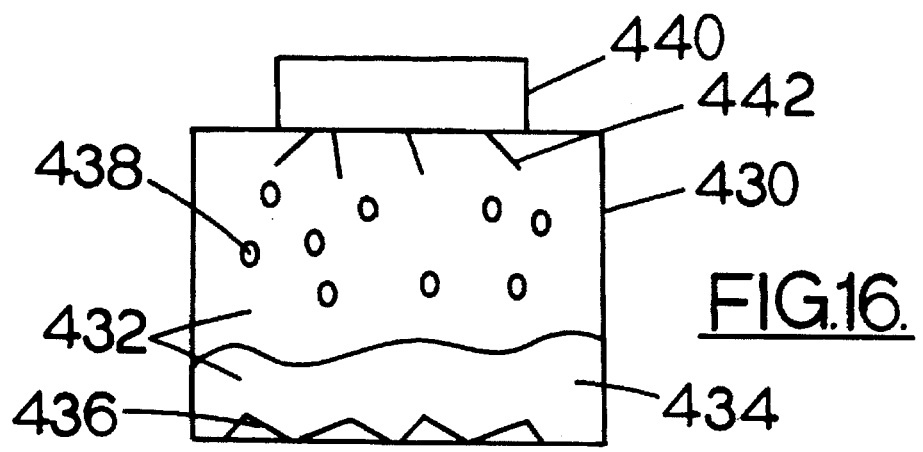
Figure 17:
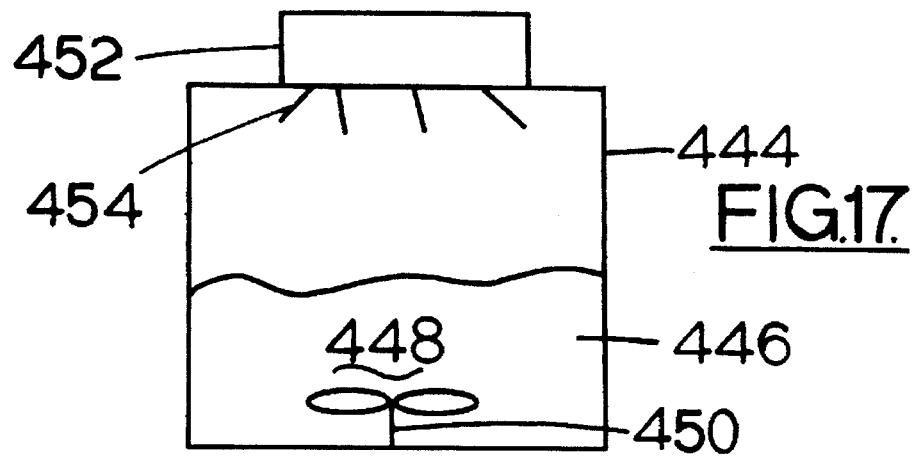
Figure 18:
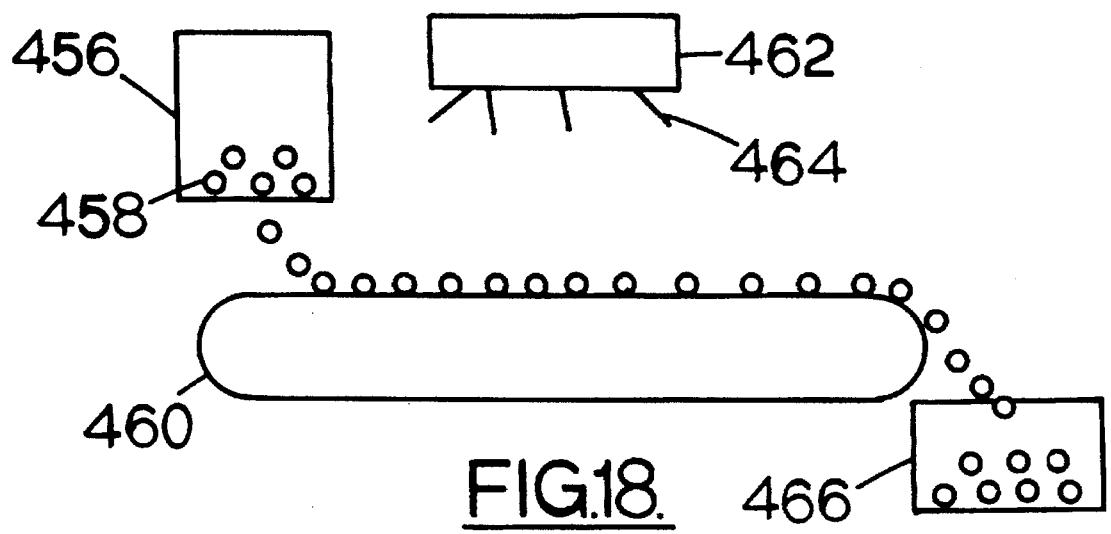
Figure 19:
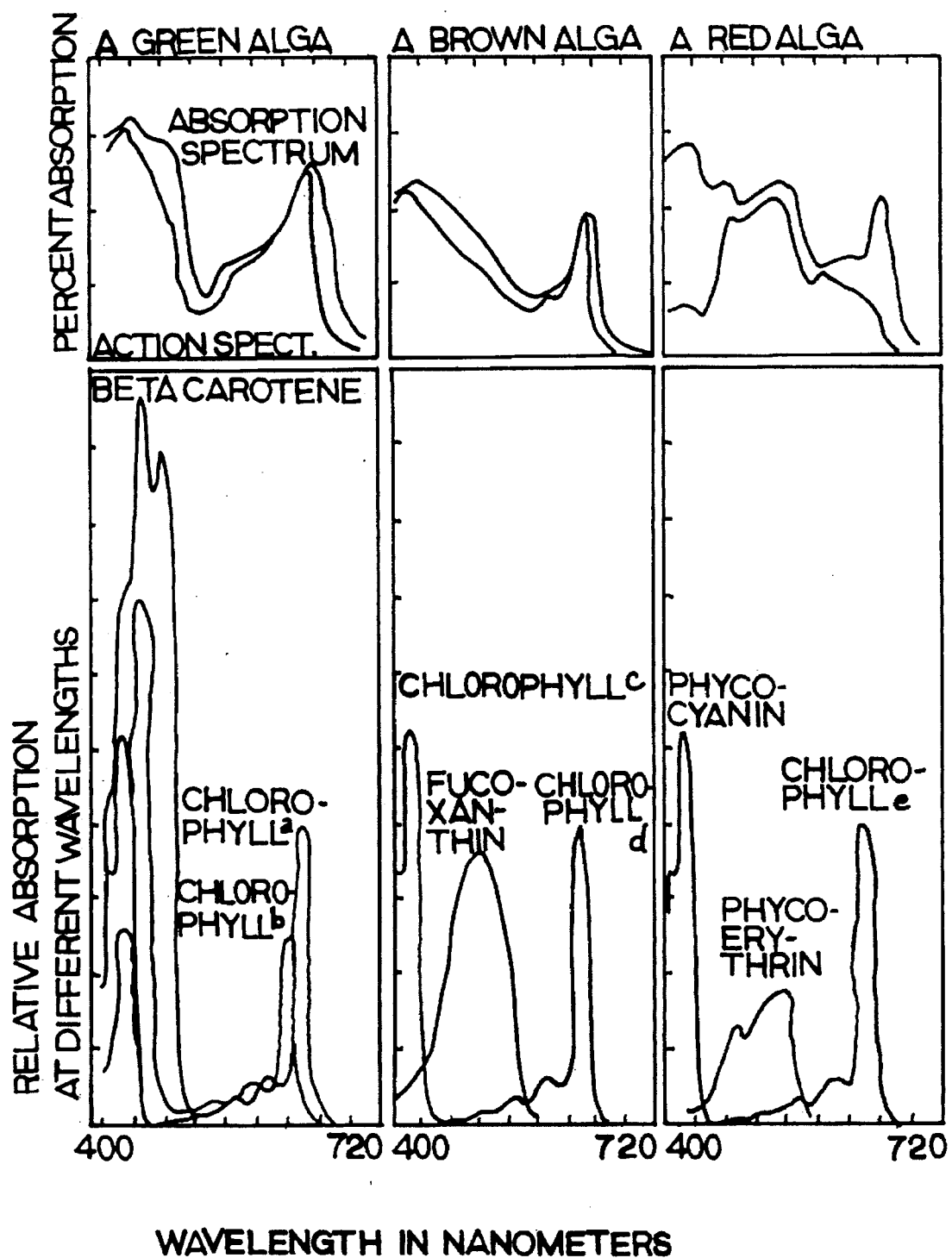
Figure 20:
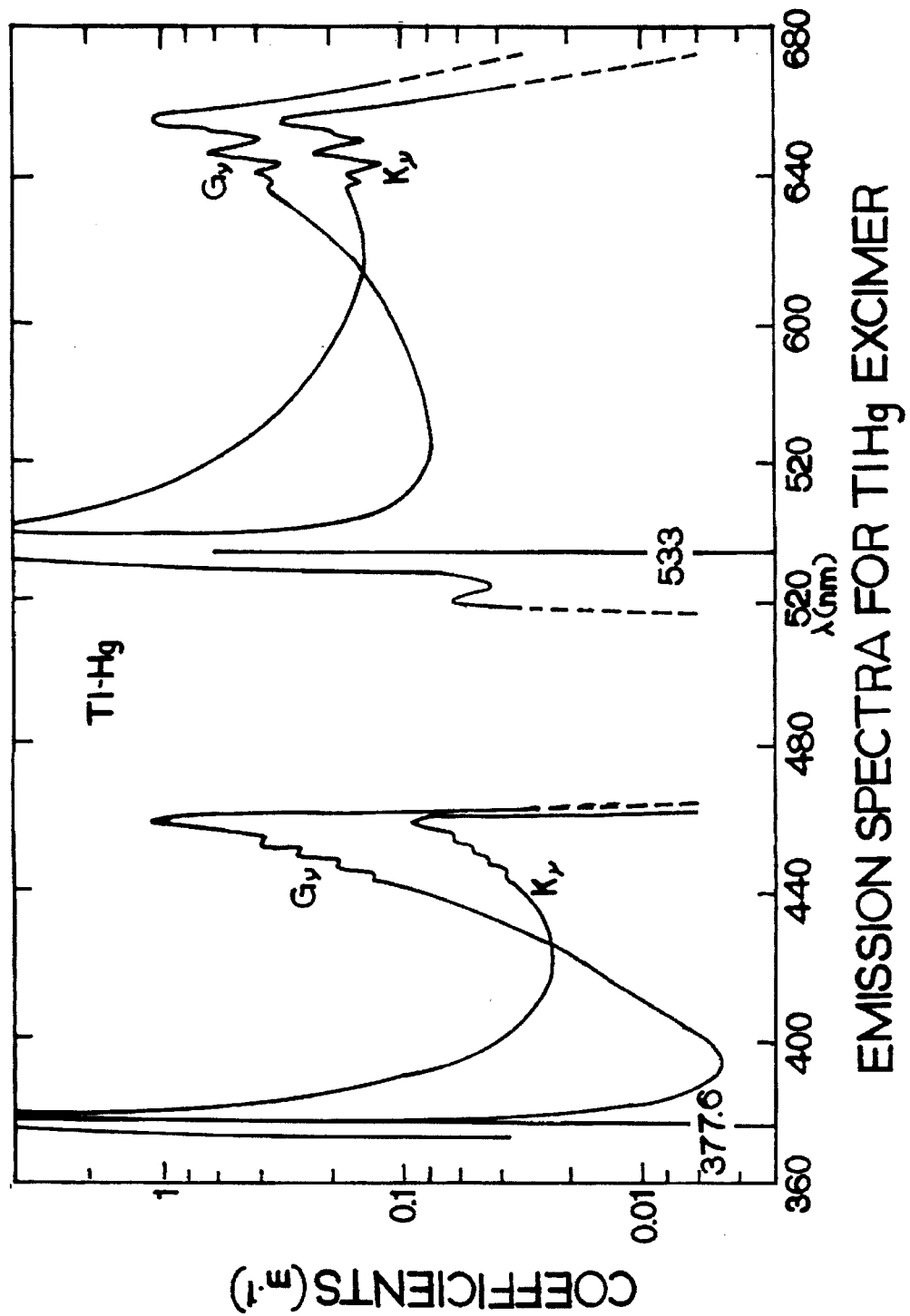
Figure 21:
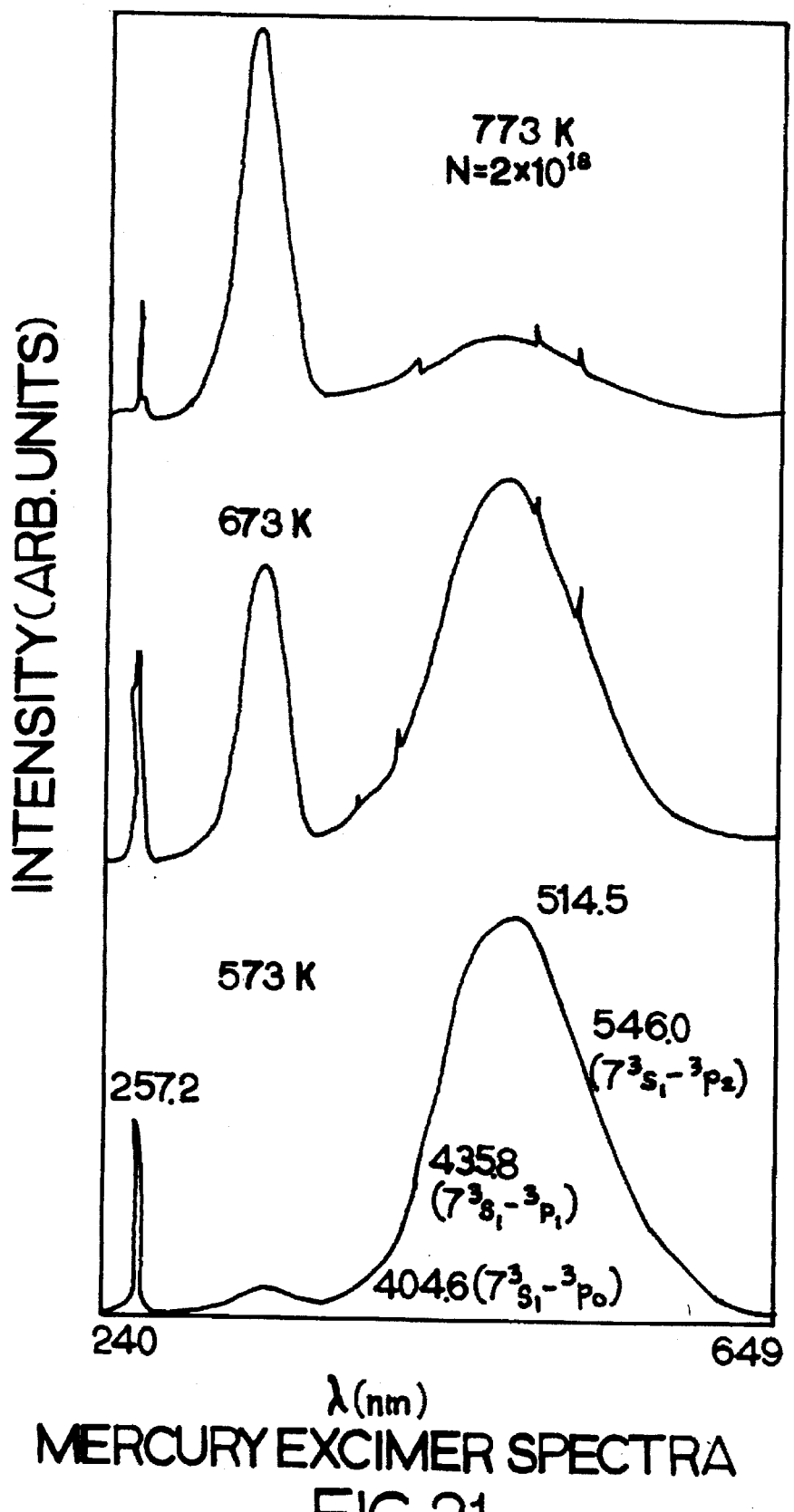

FIG. 14 is an exploded view of an UV light source of the present invention with an outer housing shown in dashed lines;

FIG. 15 is a perspective view of the assembled light source of FIG. 14;

FIG. 16 is a diagram illustrating an use of an UV light source of the present invention to process chemical waste material in a gas phase;

FIG. 17 is a diagram illustrating an use of an UV light source of the present invention to process chemical waste material in a liquid phase;

FIG. 18 is a diagram illustrating an use of an UV light source of the present invention to process chemical waste material in a solid phase;

FIG. 19 is a diagram of an absorption spectra for various types of chlorophyll;

FIG. 20 is a diagram of an emission spectra for a TlHg excimer;

FIG. 21 is a diagram of an emission spectra for an HG excimer; and

FIG. 22 is a table of theoretical maximum excimer fluorescence efficiencies.

DETAILED DESCRIPTION

MVD UV Solid State Laser

Referring now to the drawings there are shown preferred embodiments for the MVD UV solid-state laser of this invention. The laser is described in connection with vibronic laser crystals driven by an excimer photon source. The solid-state laser of the present invention is particularly adapted for utilizing a narrow-band excimer source and is characterized by the use of optically concentrated visible excimer fluorescers driven with relatively large volume, low power gas discharges, and over a range of frequencies.

The present invention incorporates large volume, low power density, visible excimer fluorescers excited by microwaves. It will be understood that the present invention offers the potential of relatively low cost, high efficiency, high power pump sources for high average power vibronic solid-state lasers.

Design studies using models for electron density, microwave propagation, and optical transport in group I-I excimers, rare gas oxide excimers, and group II-II excimers support the theory that it is feasible provide and operate the laser of the present invention. There are known material constraints that may dictate against the use of group I elements, and therefore, the present invention has developed from evaluations of rare gas oxides, group II-II, and group II-III excimers.

Group I elements are theoretically feasible but introduce more severe material constraints while the other excimers have slightly lower theoretical efficiencies. One preferred embodiment uses a XeO excimer lamp with a Ti:Sapphire laser system driven by the excimer photon source. Notwithstanding the design obstacles that will be met during further development of the laser of the present invention, it is believed that all of the above-identified excimer fluorescence sources can be used to drive solid-state lasers.

The absorption spectra for vibronic laser material is known. Two examples of vibronic laser material that were considered are Cr:GSGG and Ti:Sapphire. These Cr doped crystal laser material exhibit a good match with relatively narrow-band excimer sources between approximately 400 nm and approximately 600 nm. Cr doped solid-state laser crystals have a strong $Cr^{+3}$ absorption in bandwidths between approximately 400 to approximately 500 nm and between approximately 600 to approximately 700 nm.

The chromium doped laser crystals have absorption bands that provide a relatively good match with some group I-I excimers (e.g., Li @ 459 +/−5 nm; Na @ 437 +/−5 nm; and Rb @ 605 +/−5 nm); some group I-II excimers (e.g., NaHg @ 670 +/−5 nm; and KHg @ 617 +/−5 nm); some group II-II excimers (e.g., Hg @ 480 +/−30 nm); and some group III-II excimers (e.g., TlHg @ 450 +/−10 nm and 650 +/−10 nm).

Upon further study it will be noted that other types of tunable solid-state laser crystals also have absorption bands which match up with excimer fluorescence. One such laser crystal is Ti:Sapphire which provides a relatively good match with some group I excimers (e.g., Li, Na, K); the auroral bands of the rare gas oxide excimers (e.g., ArO, KrO, and Xeo with emission between approximately 530 and approximately 560 nm, inclusive); some group II-II excimers (e.g., Hg); and some group III-II excimers (e.g., TlHg).

Other matches can be determined from a study of the known properties of the excimers and the laser crystals.

The following description and illustration of preferred embodiments of the present invention are directed towards a generally cylindrical microwave resonance cavity which is coupled with an excimer gas. The microwave energy provides excitation of the gas and thereby create a fluorescence source. The microwave cavity also provides optical concentration, thereby making it possible to transport the excimer fluorescence to the solid-state laser media.

The results of the present invention illustrates the result of overcoming a number of problems. The microwave cavity must both excite the excimer gas mixture therein and generate a field intensity sufficient to assure that the E/N ratio suffices to sustain a discharge. Electron densities can be determined from the kinetics of the excimer system. Heat transfer can be determined to assure that the microwave cavity endures the temperature distributions.

The optical aspects of the cavity determine that the excimer fluorescence is efficiently transported to the solid-state laser. The solid-state laser output can be determined to assure that there is sufficient output to meet particular application specifications.

In order to sufficiently excite the excimer gas chosen, the resonance frequency of the cavity is presumed to be equal to the microwave source frequency. Similarly, the impedance of the microwave generator is presumed to equal the impedance of the microwave cavity.

The determination of the resonance frequency of the cavity can be a very complex problem, or as chosen for the present invention, it was presumed that the plasma parameters were uniform and the calculations proceeded with results that predict the results obtained when using the more complex technique.

The resonance frequency of the cavity is dependent upon electron density, the neutral gas density, the electron temperature, the cavity geometry, the cavity dimensions, and the mode number.

As the calculations proceed, each of these basic properties are used to generate other important parameters, for example, the electron density determines the plasma frequency, the neutral gas density and electron temperature determine the collision frequency, and the plasma frequency, resonance frequency, and collision frequency determine the plasma dielectric constant.

It was determined that the dependence of resonance frequency on electron temperature is weak over a range of from approximately 0.1 eV to approximately 1 eV, inclusive. This electron temperature range correlates to average power densities in a plasma from approximately 1 $Wcm^{-3}$ to approximately 20,000 $Wcm^{-3}$. As a result, it was chosen to approximate the electron temperature over this range of average power densities with a constant value of 0.5 eV. This approach avoids a complex treatment of the electron temperature distribution.

It was determined that a major factor in determining the resonance frequency of the cavity is electron density. It is presumed that the electron densities in the present invention are dependent upon average power density.

It will now be apparent that the selection of a cell and the associated lamps is an iterative process. First, a resonance frequency is determined. The next step is to examine the field intensities which the resonance cavity is able to generate and then to determine the power density distribution in the plasma.

A model is obtained from the foregoing from which it can be determined if the electric field is sufficient to sustain a discharge, and to determine if the power density distribution in the plasma is reasonable. If either of these determinations is negative, then new dimensions are chosen, the mode is changed, or the average power density changed. The geometry of the lamp and cell can be changed, but it was not during selection of the present invention.

Upon determining that the field intensity and the power density are satisfactory, then the average power density, geometry, gas constants, and dimensions are used to determine a heat transfer model. The heat transfer model provides a determination or prediction of the cell and laser crystal temperature gradients. If the temperatures exceed material constraints, or exceed optical constraints, then the dimensions and power density are changed and the resonance frequency is determined again for another round of computations.

If the heat transfer results are satisfactory, then the geometry and dimensions are input into an optical coupling model. The optical coupling model provides the optical coupling efficiency when the best possible reflective materials for a given wavelength are used.

Finally, the power density and optical coupling efficiency is used to determine laser output. If laser output meets or exceeds specifications, then the cell and lamp is acceptable. If laser output does not meet specifications, then new values are input into the resonance frequency model and the design process done again.

The resonance frequency was further developed from a one dimensional model and a three dimensional model of microwave-cavity-lossy-plasma systems, presuming a uniform plasma. The one dimensional model was used to generate data on plasma filled cavity resonance. Furthermore, the plasma is a lossy medium and therefore has a complex dielectric coefficient.

It is necessary to examine both the electric field and the power density within a cavity to demonstrate that the plasma can be formed within the cavity. In a steady-state situation, the microwave power must balance the power loss. Since the plasma will attenuate the electromagnetic field, the power loss can be found from The Poynting vector. The time-averaged power loss is coupled with the power density to calculate the field amplitude.

To determine if the electric field is sufficient to sustain a plasma an energy balance on individual electrons is calculated. The power gain in the plasma is found from the energy gained by the electrons per unit volume per second per electron. The minimum electric field required to sustain a discharge is determined by equating power gain to power loss and solving for the electric field intensity. For example, using the foregoing approach a 1000 Torr Xe plasma with an electron temperature of 0.5 eV requires a minimum field of 13170 V/m to sustain a discharge. In another example, a high power cell with the 1000 Torr of Xe and 5 Torr of $O_2$ has a resonance frequency of 8.86 GHz for a cell with a radius of 1 cm and a length of 20 cm.

Another component of the cell and lamp design is electron density. The electron density model is based upon the kinetics of the system and, more particularly, for the purposes of the present invention the general kinetics of excimer systems have been applied to the specific excimer fluorescers studied and considered. To reduce the complexity of the present invention it was presumed that the system was in steady-state and the electron density was so determined.

In developing the present invention the electron density in a $Na_2$ excimer system was considered. The lowest energy state of Sodium is lower in energy than the excimer state. It is presumed that the sodium excimer relies upon a different mechanism to populate the dimer. That the mechanism exists is supported since significant fluorescence has been observed.

A presumption was made that the lifetime of the sodium atomic states are increased by an optical trapping effect. Such an effect has been observed in the copper vapor laser. This effect occurs when the plasma is optically thick and the spontaneous emission photons are reabsorbed elsewhere in the plasma through stimulated absorption.

The result of this optical trapping effect is that the effective lifetime of the excimer state is longer than its natural lifetime. Thus, if the plasma is optically thick, the lifetime of the excimer state will become so long that it will in essence become a metastable state in which the primary energy loss in the state is through collisional reactions. The lamp design of the present invention is expected to be optically thick to line radiation. Only the excimer reaction which is a bound-free reaction will remain optically thin.

Excimers that rely on rare gases can take advantage of the fact that the lowest lying atomic state in a rare gas is a metastable effect. Therefore, the primary loss process in metastable rare gas states will be collisional. This results in a simplified model with excimers which have a rare gas species. It is presumed, therefore, that energy in these types of excimers will naturally flow through the excimer channel.

FIG. 11 illustrates the optical trapping effect. FIG. 12 illustrates excimers which have a rare gas species.

Ultimately, the type of process which populates the excimer state will effect the production efficiency of the excimer. The photon trapping effect which is purposely introduced into the lamp design of the present invention is based upon speculation and there is a recognized risk that losses due to wall losses, and line wing losses may be significant. The least risk system would therefore appear to be an excimer which has a rare gas species.

Dimensions for the preferred embodiments discussed in more detail below were developed from a decision to focus efforts on radial dimensions of approximately 1 cm radius and axial dimensions of approximately 20 cm.

One reason that these dimensions were used is the requirement that an electric field density be approximately 0.2 kV/cm, the cooling requirements for the lamp cavity, and the intensity requirements of a Ti:Sapphire laser crystal. Therefore, it will be understood that other equivalent lamp and cell designs and dimensions can be determined based upon the particular requirements of electron field density, lamp cavity cooling requirements, and intensity requirements for the particular laser crystal.

A heat transport model of the present invention presumes a one-dimensional radial geometry and good thermal contact between the microwave transparent, dielectric tube and the conductive resonance cavity. In a preferred embodiment described below, the tube is quartz and the resonance cavity aluminum. In other preferred embodiments, particularly for the low frequency embodiments, other materials are illustrated and described.

In one preferred embodiment the cylinder walls outside surface will be covered with fins to increase the effective convective heat transport area by a factor of two. Air cooling is used for the preferred embodiment, but it will be understood that other cooling means can be applied to the present invention.

Thermal conductivity of Xe was presumed to be k=0.01121 W/m-K @ 800 K. It has been further presumed for the heat transfer model that the gas is sealed in the quartz tube and that natural convection will increase gas conductivity. However, it will be observed that in the preferred embodiments that the gas is circulated through the tube.

Conductivities can be determined from standard engineering references. The quartz tube has a thermal conductivity of k=1.4 W/m-K @ 400 K. The thermal conductivity of aluminum is k=206 W/m-K @ 400 K. Therefore, from standard equations for radial heat conduction and thermal equilibration time, it is determined that the equilibration time is on the order of milliseconds for the above cell parameters and materials used.

An initial design parameter was that the laser system provide greater than 25 mJ pulses at a frequency of 100 Hz.

Based upon these design parameters (laser pulse=25 mJ), presuming a 0.2 m long by 0.01 m radius resonance cavity, a pulse width of 5 μsec, a fluorescer efficiency of 0.15, an optical concentrator frequency of 0.32, a screen (see detailed description) transparency of 0.9, an efficiency of converting the optical energy to laser energy of 0.5, and a frequency tripling efficiency of 0.5 the peak power density is determined to be $386\times10^6$ W/m$^3$ for two lamps that pump the laser with an average power density of $3.686\times10^6$ W/cm$^3$.

A similar calculation can be made for laser crystal temperature. An assumption is made that the laser crystal is cooled by slow flowing distilled water. The temperature distribution can be found by presuming a one dimensional heat transfer equation using cooling on both surfaces. Water is a good coolant and the bulk temperature of the water is presumed to remain low at approximately 20° C. The thermal conductivity of Ti:Sapphire is 35 W/m-K and the convection heat transfer coefficient is 1000 W/m$^2$-K.

The final consideration is the transportation of photons from the visible excimer fluorescer lamp of the present invention to the solid-state laser to provide the cell and operation of the cell of this invention.

The theoretical support of the present invention is so far only directed towards the use of simple conical sections and cylinders. It will be understood that the geometry and dimensions of a particular fluorescer lamp may vary and that the embodiments of the present invention described herein reflect the limits of the theoretical work performed and not the limits of the equivalent structures and/or methods which additional theoretical study may predict.

It has been presumed that there is a non-weighted random spatial photon birth distribution. This distribution can also be a function of resonant surfaces in the microwave cavity.

The ratio of the diameter to length of a cylinder determines the percentage of photons that reach the end of the cylinder. For small ratios there is less efficiency but those photons that do survive generally have higher output angles. This is believed to be important. Results so far indicate that cones may exhibit better properties than cylinders in that they turn the photons to the larger diameter end and decrease the angle to the center with each reflection.

However, even though the angular distribution is favorable, there appears to be a trade-off in intensity loss. Still, cones or groups of cones and cylinders seem to provide the preferred embodiments of the present invention and to be the most promising foe an optimal microwave cell. While the efficiencies of other geometries will be tested, the overall function and utility of the present invention is established.

Photons are lost to the optical system through a number of potential loss mechanisms. The photons may be lost through transmission through the aperture of the cell, absorption in the cell wall's dielectric coating, absorption at the reflecting wall (e.g., mirror), and absorption by the plasma.

In providing a preferred embodiment the latter three are minimized and the former maximized. This can be accomplished by limiting the mean free path of the photons in the cell and limiting the number of photon reflections. It is presumed that by making the cell diameter to cell length ratio as large as possible that both of the limiting goals can be accomplished.

Conical geometry provides a forward scattering angular distribution. Therefore, depending upon the conical angle, the angular distribution can be a strong forward scattering distribution at a relatively very high coupling efficiency where 90% of the photons have an angle with respect to the axis of less than 10°.

A consideration for the construction of the present invention is compatibility of materials with alkali metals for the group I-I and group I-II excimers. For example, temperatures greater than 700 K. is required to achieve vapor pressures greater than 10 mm (10 Torr).

Other excimers produce light within the absorption bands of vibronic solid-state laser crystals although at slightly less theoretical maximum efficiency.

Group II-II, group II-III, and rare gas oxides are considered usable with the present invention. In particular, the use of Hg and XeO are considered to have less severe material constraints since the Hg excimer achieves a relatively high pressure at a temperature of 600 K. with a theoretical efficiency of 20.1% and is compatible with glass (i.e., glass tube is microwave transparent and a dielectric) at temperatures up to 800 K.

The mercury excimer will radiate in both 480 nm and 335 nm bands as a function of temperature, emitting preferentially and efficiently in the 485 nm band at relatively low temperatures.

The XeO excimer operates at much lower temperatures than the mercury excimer. XeO has excimer emission at 547 nm and theoretical efficiency of 15.1%. This emission is within the absorption spectra of the Ti:Sapphire vibronic laser.

It will be understood that the use of group I-I and group I-II excimers is not ruled out, only less preferred because of present day material constraints in economically producing the present invention. The mercury, xenon oxide, and the krypton oxide excimers are preferred due to material constraints although the trade off of a lower theoretical fluorescence efficiency must be recognized.

The following preferred embodiments of the present invention focus on the use of a high frequency design and a low frequency design. The high frequency design contemplates using a 5 GHz to 18 G Hz source and the low frequency design is intended to use the relatively inexpensive 2.45 GHz microwave source. However, the use of power sources from at least 0.5 Ghz to as great as 240 GHz are all feasible with the present invention.

High Frequency Embodiments

The drawings show a fluorescer pumped laser 10 in conjunction with a high frequency design that comprises means for containing a narrow-band visible excimer fluorescer. A pair of opposed aluminum cylindrical resonance cavities 12 and 14 contain quartz tubes 16 and 18, respectively. The excimer gas mixture is contained in the quartz tubes. The quartz tubes have good thermal contact with the inside of their respective aluminum cavities. A silver coating is applied to the inner surface of each aluminum tube and to the opposing back plates at either end of the assembly.

A microwave conduction barrier is located at the end of each cavity. In one preferred embodiment the conduction barrier is a fine metal screen 20 and 22. The metal screen preferably has approximately 10 lines per inch which provides good optical transport characteristics, e.g., $\eta$ of approximately 0.9 but remains a microwave conduction barrier. Each resonance cavity has an associated microwave antenna 24 and 26 located at the respective back plates and associated with remote tuning assemblies 28 and 30, respectively.

A laser crystal slab 32 is located at the end of and between the quartz tubes. The microwave antenna are located at the opposite ends of the respective quartz tubes.

The microwave antenna can be a probe or a loop depending upon whether the coupling is a TE mode or a TM mode.

Figure 1:
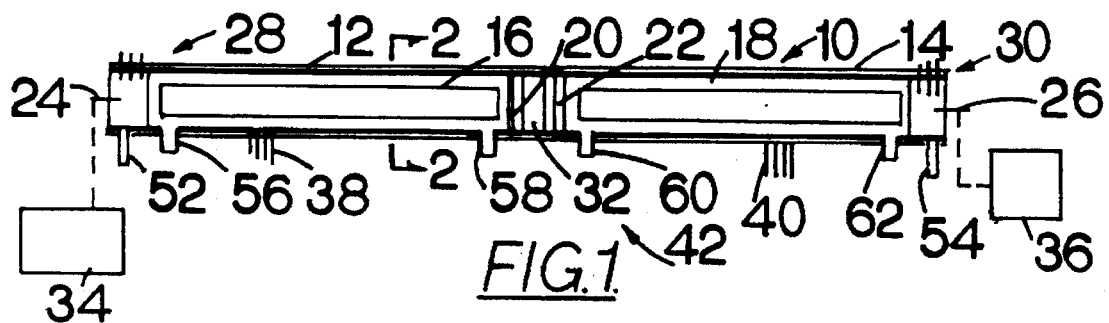
FIG. 1 is a diagram of a MWD UV solid-state laser fashioned in accordance with the present invention illustrated to show one preferred embodiment of a proposed construction.
Figure 2:
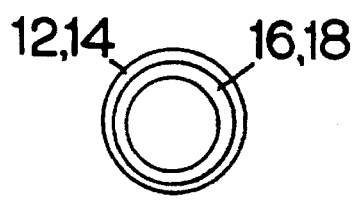
FIG. 2 is a cross-sectional view taken along line 2—2 in FIG. 1.
Figure 3:
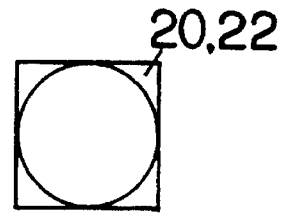
FIG. 3 is an elevation taken through a laser media portion of the embodiment illustrated in FIG. 1.
Figure 4:
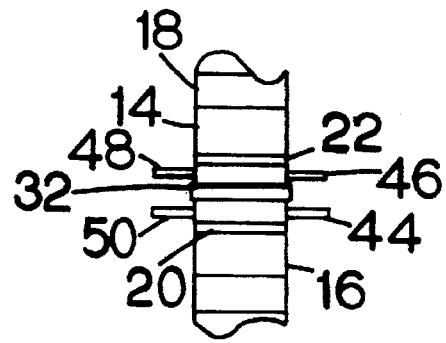
FIG. 4 is a partial illustration of the laser depicted in FIG. 1 with particular emphasis on a slab of laser media in between a pair of resonance cavities.

In operation, the laser crystal slab 32 is pumped from both sides. This is believed to have a number of advantages, for example, the crystal thermal gradient is favorable and the heat transfer requirements for each of the resonance cavities is reduced. FIG. 1 illustrates the use of a short stub microwave tuner which includes some operational problems related to phase matching the particular resonance cavity.

In another embodiment, a HF microwave generator impedance phase matching circuit 34 and 36 is provided which would be an option and replace the stub tuners. A sample circuit is shown in FIG. 13.

A selection of a microwave system is believed to be best approached by designing the laser configuration around conventional microwave sources using either an electron gun or a cathode. Therefore, the described embodiments of the high frequency laser are initially designed for use with a light weight microwave power source having a peak pulsed power output of less than approximately 5 Megawatts, a pulse width of less than approximately 5 microseconds, and a repetition rate of less than approximately 1 kHz.

Laboratory tests indicate that a microwave source based upon an anode and foil may be a preferred alternate power source if a wider pulse width is necessary. It is believed that this form of a microwave power source may be able to achieve pulse widths of approximately 15 microseconds. These types of microwave sources have demonstrated efficiencies of greater than 50%. It is believed that the efficiency can be improved to approximately 70%.

The resonance cavities are forced air cooled using cooling fins 38 and 40 (shown over only part of the cavity for purposes of clarity of the rest of the diagram).

The laser crystal has its own cooling system 42 which includes coolant outlets 44, 46 and coolant inlets 48, 50. The cooling system in a preferred embodiment is a closed loop water cooling system.

Each resonance cavity has an associated vacuum manifold connection 52 and 54 for inducing a flow of excimer fluorescer plasma within each tube. Therefore, each quartz tube has a gas inlet 56 or 60 and a gas outlet 58 or 62 to initiate flow.

Numerous designs were considered by changing size and operating characteristics to match laser output specifications to the microwave Source specifications. In a preferred embodiment the diameter to length ratio is chosen as 0.1 which should provide an optical coupling efficiency of approximately 0.5.

In a preferred embodiment of a high frequency model projected by the simulated results, it should be feasible to construct a frequency doubled Ti:Sapphire laser with greater than 25 mJ output at wavelengths between approximately 350 nM and 450 nM at 100 pulses per second. According to current predictions the preferred design would use a 416 kW, 6.67 GHz microwave source pulsed at 100 pulses per second with a pulse width of approximately 1.5 µS.

It is further projected that the preferred cell would consist of two (2) lamps. Each lamp would have an inner and outer plasma diameter of approximately 1.8 cm and 0.88 cm, respectfully, and a length of approximately 34.8 cm. In the preferred design projected by the work done to date it is expected that photons from each lamp in the cell would be channeled with the optical waveguide to a Ti:Sapphire slab laser approximately 2.0 cm by 2.0 cm by 1.2 cm thick.

Low Frequency

A variety of low frequency designs are illustrated schematically in FIGS. 5 through 9 and FIG. 10, which will be discussed last, illustrates a particular low frequency lamp (one of two opposing lamps that comprise a cell) that excites a laser crystal intermediate the cells.

In general, each low frequency cell has a quartz tube or cone located centrally within a microwave resonance cavity. The tube or cone is filled with or has moving through it an excimer fluorescer. It will be understood from the diagrams that plasma flow and chamber cooling flow may be indicated by appropriately identified arrows.

Referring now to the various cell designs, FIG. 5 is illustrated schematically to show the aspects of one such design in which a fluorescer pumped laser cell assembly 100 includes a pair of opposing aluminum resonance cavities 102 and 104 with associated centrally disposed quartz tubes 106 and 108. A pair of microwave antennae 110 and 112 are provided to excite a portion of excimer fluorescer within each quartz tube. A laser crystal slab 114 is positioned between the two opposing lamps of the cell assembly 100.

Flow of excimer fluorescer is accomplished with a gas inlet 116 and a gas outlet 118 associated with one quartz tube to initiate gas flow. Similarly, the other lamp includes a gas inlet and a gas outlet which are not shown.

Each quartz tube is coated with a thin dielectric coating 120 and 122. A mirror is located at the end of each lamp opposite the laser crystal as indicated for one lamp at 124.

Another embodiment is illustrated in FIG. 6 in which another cell 130 includes a pair of opposing lamps comprising one and another aluminum resonance cavities 132 and 134 in which is located one and another generally conical section quartz tubes 136 and 138. Each quartz tube is coated with a layer 140 and 142 of a dielectric material applied in a relatively thin coat. A laser crystal slab 144 is located intermediate the lamps. Mirrors 146 and 148 are located at opposite ends of the lamps as illustrated in the drawing figure.

While gas and cooling flow may be part of this embodiment, they have not been indicated on the drawing only for purposes of clarity. It will be understood that the gas flow and cooling flow would be similar to the other embodiments show and described.

Another variation of the fluorescer pumped laser cell assembly 150 is illustrated in FIG. 7. In this variation the lamps comprise one and another metal cavities 152 and 154. Each metal cavity has a quartz tube 156 and 158 therewithin. Each quartz tube is separated from its respective cavity by a layer of metal 160 and 162, respectively. A laser crystal slab 164 is located intermediate the lamps. A mirror 166 is located at the end of each tube (only one shown). Microwave antennae 168 and 170 provide the energy to excite the excimer fluorescer.

The fluorescer pumped laser cell variation 172 illustrated in FIG. 8 includes a pair of opposing lamps including non-conductive dielectric enclosures 174 and 176. Each enclosure has associated therewith a quartz tube 178 or 180. A metal layer 182 or 184 coats the length of the respective quartz tube. A laser crystal slab 186 is located intermediate the lamps. Each lamp is excited by it associated microwave antenna 190 or 192.

FIG. 9 illustrates another fluorescer pumped laser assembly cell 194 in which metal containers 196 and 198 enclose respective quartz tubes 200 and 202. Each quartz tube has a metal layer 204 and 206, respectively, coating the tube. A laser crystal slab 208 is intermediate the opposing lamps. A mirror is located at each opposing end of the lamps. Only mirror 210 is shown.

A particular preferred embodiment 300 of the low frequency cell will now be described and is illustrated in FIG. 10. Now describing one of two lamps 302 (the other lamp is not shown but will be understood to be the same but opposite hand as in the previously described embodiments). A quartz tube 304 has a mirror 306 at one end and is coupled with a laser crystal 308 at an opposing end which is intermediate the lamps. A plasma 310 fills the quartz tube 304. The quartz tube is located in the center of a microwave resonance cavity 312.

The resonance cavity could be a vacuum or filled with a dielectric liquid 314, as illustrated in FIG. 10. Filling the resonance cavity with a dielectric should reduce the temperature of the quartz tube, in the described embodiment, from approximately 600° C. to approximately 100° C.

Photon concentration efficiencies have been calculated to be very good for diameter to length ratios which are between 0.01 and 0.1, inclusive.

In another preferred embodiment, referring still to FIG. 10, the use of a thin layer of metal on the tube will make it possible to concentrate photons on the laser crystal 308. In a preferred embodiment a thin layer of silver atoms is provided with a layer thickness of between approximately 300 A° to approximately 1000 A°, inclusive.

This range is selected for the particular embodiment since at 300 A° the layer is just thick enough to be optically thick and at 1000 A° the layer is thin enough to allow the microwaves to penetrate. It will be understood that equivalent coating materials and ranges exist although not specifically described herein which will satisfy these requirements.

The foregoing embodiment contemplates a low frequency embodiment using a 2500 W, 2.45 GHz microwave source with a pulse width of approximately 8 ms and a repetition rate of 60 pulses per second. The generally cylindrical geometry includes a tube approximately 1 cm in diameter, a resonance cavity approximately 7.34 cm in diameter and 22 cm long.

A sliding assembly 314 approximately 7 cm long provides for changing the effective length of the resonance chamber relative to the quartz tube. As seen from FIG. 10, this is accomplished by threaded adjustment means 316, 318 that causes the movement of sliding tube 320 relative to the resonance chamber. Seals, for example O-rings 322 and 324 (which would be suitably heat resistant) maintain the vacuum or the dielectric within the resonance chamber 312.

An adjustable position microwave antenna 326 is provided. The diagram also notes that the gas flows through the quartz tube from 328 to 330. Similarly, the dielectric (if included) flows through the resonance chamber from 332 to 334 and is cooled before returning to the chamber.

Microwave Driven UV Light Source

The microwave driven excimer fluorescer source described in detail above provides an improved UV or visible light source or lamp for additional applications when constructed without the addition of laser media and solely for the purpose of generating a microwave driven UV light source, A general description of a lamp constructed in accordance with the foregoing description for the lamp but excluding the laser media and uses for the lamp follows. The lamp or energy source or light source described above with respect to the laser embodiment is also functional without the laser media or without being restricted to generating laser light. This lamp and some of its uses are described in the following description, drawings, and claims.

The lamp of the present invention relies in part upon the fact that excimer fluorescers are efficient sources of narrow band radiation.

Excimers are excited molecule complexes such as $Xe_2^*$, $KrF^*$, and their equivalents. These excimers exist for only a short time. During the decay of the excimer the associated binding energy is emitted in the form of electromagnetic radiation. Referring again to FIG. 22, under the right conditions, the theoretical maximum efficiency of excimer fluorescers is high. Experiments with excimers have been conducted and reported in the literature. These experiments have demonstrated the theoretical maximum efficiencies.

The use of excimers for lamps of the present invention utilize advantages of excimer fluorescers. The major advantages are that the ground state of excimer fluorescers is unbound, hence there is little or no self-absorption, and that the atomic ion and excited states can be efficiently channeled into the excimer state.

The lamp of the present invention, utilizing these advantages, can incorporate large volume excimer fluorescer cells that can be optically thin. Furthermore, if ions and excited states can be formed efficiently, then the excimer state can be formed efficiently.

It is important to appreciate the disadvantages and limitations of excimer fluorescers as well as the advantages. One major disadvantage of excimer fluorescers is related to collisional loss processes with electrons that compete with the desired radiative processes of excimers. These collisional loss processes with electrons require that excimer fluorescers operate at below a certain power density limit. It is expected that each excimer fluorescer will have a specific power density limit.

These limits are expected in rare gas excimers which can theoretically operate efficiently up to power densities of $5\times10^5 W^{-3}$. Alkali metal excimers are expected to operate efficiently up to power densities of $2\times10^{4-3}$.

Another disadvantage of the excimer fluorescer is that in order to efficiently form the excimer with atomic ion and atomic excited states, the pressure in the fluorescer must be relatively high. This is due to the enhancement of the collisional mechanisms between the atomic ions and atomic excited states with neutral atoms that are responsible for the formation of the excimer.

In view of the advantages and the disadvantages of using the excimer fluorescers in the lamp of the present invention, and particularly the high pressures required for efficient excimer production, there appear to be a limited number of ways by which the excimer fluorescer can be excited. A further practical restriction on the type of excitation method that can be used is the power density limitation.

As a result the type of excitation methods which have been successful for the efficient production of excimer fluorescence and reported are:

pulsed excitation methods such as electron beams and transverse discharges (Rhodes, C. K. (1979) *Excimer Lasers*, Springer-Verlag, New York Inc., New York), and ion beams (Ulrich, A., *Results from Ion Driven Plasma Experiments Using a Tandem Accelerator*, Proceedings of Specialist Conference on Physics of Nuclear Induced Plasma and Problems of Nuclear-Pumped Lasers, Institute of Physics and Power Engineering, Obinsk, Russia (May 26–28, 1993)).

Other types of excitation methods which have been successful for the efficient production of excimer fluorescence and also reported are quasi-steady-state or steady-state excitation methods such as:

dielectric barrier discharges (Eliasson, B. and Kogelschatz, U., *Dielectric-Barrier Discharge as an Efficient Source of UV and VUV Excimer Radiation*, IX International Conference on Gas Discharges and Their Applications, Venezia, Italy (Sep. 19–23, 1988), nuclear excitation (Prelas, M. A., Boody, F. P, Kunze, J. F., and Miley, G. H., *Lasers and Particle Beams*, 6(1), 25, (1988)), and microwave discharges (Kumagai, H., and Obara, M., *Appl. Phys. Lett.* 54, 2619 (1989), and Offermanns, S., *J. Appl. Phys.* 67(1), 115 (1990)).

The lamp of the present invention uses a combination microwave discharge and an optical concentrator cell (described below and illustrated in the accompanying drawings) to generate excimer fluorescence and to concentrate the fluorescer onto an optically transparent aperture.

It is believed that the lamp invention described below when built should be capable of producing high intensity, high efficiency escimer photon sources. The resulting fluorescer cell should then be useful for most of the identified excimer media. It should then be possible to produce a number of discrete, narrow band, efficient fluorescence sources which would be useful and valuable for a number of commercial applications, some of which are described below.

A light source or lamp or cell of the present invention is expected to produce efficient, narrow band incoherent electromagnetic radiation at a cost per photon that is significantly less than currently available in more expensive laser systems.

A schematic of one preferred embodiment of the lamp of the present invention has been developed and is illustrated in the drawings figures and described below. It will be understood that the lamp illustrated and described is subject to refinement and improvement as confirmation of the feasibility of the lamp is obtained through testing a prototype.

As shown in FIGS. 14 and 15, a preferred embodiment of the light source or fluorescer cell is constructed from a length of polished aluminum tubing 400 which forms a chamber 402. One end 404 of the chamber 402 is sealed by an aluminum end plate 406 which is preferably welded to the chamber 402. An opposite end of the chamber 402 is covered by an aluminum screen 408 and a window 410 of an appropriate material, for example quartz.

A polished aluminum sliding sheet 412 for shorting out the chamber during tuning is welded to an aluminum tuning rod 414, inserted through an aperture 416 in the end plate 406 and welded in place. A gas-fill valve 418 is inserted through a second aperture 420 in the end plate 406 and sealed in place.

An opening 422 is drilled through the chamber 402 for coupling a conventional magnetron 424 and a microwave guide 426 that allows the lamp to be used in vacuum UV, UV, and visible ranges.

It will be understood that aperture coupling can be substituted for the wave guide or antenna coupling illustrated schematically in the drawings. While no illustration is provided, aperture coupling is understood by those skilled in the art. If a reference is needed, then one only need refer to J. C. Slater, *MICROWAVE ELECTRONICS*, Van Nostrand, New York, for a description of either coupling method.

A vacuum line 428 is attached to the gas-fill valve 418 and the lamp tested for vacuum leaks.

Once a proper vacuum is established, and an appropriate gas, as described fully above for the laser embodiment, is introduced into and sealed within the chamber 402, then microwave radiation is introduced into the chamber, and the chamber is tuned to the desired frequency.

Once tuning is complete, the tuning rod 414 will be permanently sealed. As the method and process of tuning a microwave chamber of the sort described above is well known to those skilled in the art, such tuning will not be described in further detail herein. It will be further understood that the functionally equivalent aperture coupling can also be tuned in the sense used above.

It is presently preferred to use a Xenon excimer gas. Xenon excimer lamps, with efficiencies approaching 40–50%, are predicted to provide a UV source which is extremely economical to operate.

It is anticipated that excimer fluorescers and the lamp of the present invention can be used as light sources for photon sources to treat hazardous chemical waste.

Focusing the development of excimer lamps upon the rare gas fluorescers can take advantage of the 1989 work of Esrom, Wahl, and Kogelschatz which shows that UV induced processes for patterned deposition is generally considered to be a superior process. Their published work discusses that platinum layers have been deposited using a Xe excimer barrier discharge lamp with superior sticking properties. The lamp of the present invention should be capable of the same or similar results for the same or similar processes.

While many potential uses for the high energy source of the present invention have been disclosed above, two applications are particularly promising and will be described in further detail. The purpose of the following description is two-fold. First, two preferred embodiments of the present invention are described. Second, it is believed that one skilled in the art will even better understand the present invention in light of the following descriptions.

One use for the light source of the present invention is as an ultraviolet light to break down hazardous chemicals. This embodiment of the microwave driven excimer lamp of the present invention provides a breakthrough in technology which makes UV breakdown of hazardous chemicals economically feasible.

It is understood that light (photons) interact with matter by absorption. If an absorbed photon has a high enough energy, it can break chemical bonds. The process can be described as follows.

The chemical bonds have a cross section for absorbing photons ($\sigma$). The reaction rate at which bonds are broken is:

$$\text{Reaction Rate} = K N \sigma I \qquad (1)$$

where N is the molecular density of the hazardous chemical per cm$^3$; $\sigma$ is the absorption cross section in cm$^2$; I is the light intensity in Watts-cm$^3$; and K is 1/hv, h being Plank's constant, v is the frequency of the photon.

In order to be efficient, the reaction rate must be high. From equation (1) it can be seen that either N or I must be increased to increase the efficiency. As the absorption cross section does not vary significantly from chemical to chemical, the most effective way to increase the reaction rate is to intensify the light source.

Referring now more specifically to the selection of excimers for use in the lamp of the present invention and the particular uses to which it may be put, the UV light used for the destruction of hazardous and/or chemical waste functions by breaking chemical bonds and thereby reducing the waste to its basic elements.

It is generally known that breaking a chemical bond with UV light requires a photon with an energy on the order of 5 eV. From equation (2) it can be determined that functional light containing photons with an energy on the order of 5 eV has a wavelength below 248 nm.

$$\lambda = 1240/E \qquad \text{Equation (2)}$$

where $\lambda$ is the wavelength in nanometers and E is energy in eV.

A satisfactory lamp for commercial applications requires a source that emits over a rather narrow range of wavelengths in order to obtain significant overlap with the absorption band or bands of a specific commercial process. The energy source also requires the photon energy to be a significant fraction of the excitation energy in order to maximize lamp and excimer extraction efficiency.

Self-absorption of the photons in the lamp must be minimal so that the emitted radiation is not broadened out of the absorption band or bands of the specific commercial process. Additionally, limited self-absorption assures that the light is extracted from the lamp rather than retained within the fluorescer. This will minimize heating and excessive broadening of the emitted radiation out of the absorption band or bands.

Excimers, dimers and trimers that exist only in the excited state and which are unbound in the lower energy state, are the only category of radiators that fulfill the foregoing criteria. This is due to rapid dissociation which results in a small ground state population so that they are not self-absorbed. The reaction can be expressed as:

$$Xe_2^* \rightarrow 2\,Xe + h\nu \qquad (3)$$

which is discussed in Chung, A. K. and Prelas, M. A. (1987), *Sensitivity Analysis of $Xe_2^*$ Excimer Fluorescence Generated from Charged Particle Excitation, Lasers and Particles Beams*, 5(1) 125–132.

It is known that $Xe_2^*$ has a relatively narrow emission bandwidth of 15 nm and the average energy of the $Xe_2^*$ (B-X) transition is approximately 15 eV (Platzman, R. L., *Int. J. Appl. Radiat. Isotopes* 10, 116 (1961)) providing an intrinsic fluorescence efficiency of 48%.

Use of the $Xe_2^*$ excimer in a lamp of the present invention is preferred for confirmation of the theory and operation because of its high efficiency.

FIG. 22 illustrates Theoretical Maximum Excimer Fluorescence Efficiencies and Wavelengths. Reference to this table will identify excimers having wavelengths appropriate for the breakdown of hazardous and/or chemical waste. The excimers include KrF, KrCl, KrBr, ArF, KrI, ArCl, $Xe_2$, $F_2$, $Kr_2$, $Ar_2$, and NeF.

It will now be understood that for other uses of the present invention there will also be particular energy requirements that may be known or determined. FIG. 22 can be used to select the most appropriate excimer for a particular use or uses selected for the lamp of the present invention from the list of excimers. Similarly, the wavelength and efficiency data for other excimers is known and a particular excimer could be selected for other lamp uses if the wavelength/energy requirements are known or can be determined for the desired process.

Several examples follow and it will now be understood that the use of the above and other known reaction rate and energy equations will allow one skilled in the art to select the appropriate excimer or excimers for the particular use of the lamp of the present invention.

There are at least three conventional known methods used to process chemical waste material. The chemical can be bombarded with UV radiation while in the gas phase, in the liquid phase or in the solid phase, as seen in FIGS. 16, 17 and 18, respectively.

In a Gas Phase as represented schematically in FIG. 16, a container 430 contains an amount of a chemical waste material 432 in the liquid phase 434 which is heated by a heat source 436. The heat added to the liquid creates an amount of waste material in a gas phase 438. A UV lamp 440 of the present invention generates radiation 442 at a suitable wavelength to process the vapor by radiation absorption and subsequent chemical reaction to process the chemical waste.

In a Liquid Phase as represented schematically in FIG. 17, a container 444 contains an amount of a chemical waste material 446 in a liquid phase 448 which is stirred by a stirring mechanism 450. The stirring mechanism agitates the liquid so as to continually expose different portions of the liquid to the output of a UV lamp 452 of the present invention. The lamp generates radiation 454 at a suitable wavelength to process the liquid by radiation absorption and subsequent chemical reaction to process the chemical waste.

In a Solid Phase as represented schematically in FIG. 18, a container 456 holds an amount of a solid chemical waste 458 for transfer to a conveyor 460 or an equivalent of the conveyor. The conveyor carries the amount of a chemical waste in the solid phase 458 to expose the solid material to the output of a UV lamp 462 of the present invention. The lamp generates radiation 464 at a suitable wavelength to process the solid by radiation absorption and subsequent chemical reaction to process the chemical waste. Treated waste is transferred to container 466.

The tremendous efficiency of the high energy lamps of the present invention make UV radiation of chemical wastes an economical alternative to more complex method of chemical waste destruction or storage.

Efficient light sources can also be used in greenhouse farming. During the winter months, when the days are short, an artificial light source is often used to enhance plant growth and increase yields. Unfortunately, conventional light sources are relatively inefficient in producing photons in the wavelengths absorbed by chlorophyll. It is estimated that a lamp constructed in accordance with the present invention should provide an improvement of factors of 15 or greater over current lamp alternatives.

When examining the absorption spectra of common types of chlorophyll as shown in FIG. 19 to determine an appropriate light source, it is important that the light source spectra overlap the chlorophyll absorption bands. Several excimer light sources have spectral output which match up with chlorophyll absorption bands.

Of these excimers, TlHG appears to have an ideal spectral overlap with chlorophyll. The TlHg excimer has two strong emission bands at 450 nm and 640 nm as shown in FIG. 20.

Another excimer, Hg, has an excellent spectral match up with chlorophyll, as shown in FIG. 21. A strong emission band is seen at approximately 514 nm.

Use of the microwave driven UV source of the present invention utilizing a TlHg or Hg excimer would offer a high efficiency alternative to current sources available. With proper excimer selection and tuning of the source, improvements of a factor of 15 or more are potentially attainable.

Further development of the lamp of the present invention will focus on substantiating the theoretical assumptions that lead to the anticipated feasibility of the combination microwave discharge cell and optical concentrator. As further development continues a $Xe_2^*$ excimer fluorescer test cell will be designed for use with a standard 2.5 KW, 2.45 GHz microwave source.

It is expected that the lamp of the present invention can be demonstrated and a microwave discharge cell can be designed such that the discharge cell provides the optical concentrator. Confirmation of the principle of exciting a $Xe_2^*$ excimer fluorescer with microwave energy and extracting the excimer fluorescer with the optical concentrator is expected in the near future. Once this has been accomplished, then microwave excited excimer lamps which use other excimers will be developed.

Confirmation of the feasibility of the lamp of the present invention will include the development of a microwave code and couple it with an optical ray tracing code. This will allow the development of an optimum configuration for the excimer lamp. The construction of a $Xe_2^*$ excimer lamp with the 2.5 KW, 2.45 GHz microwave source will allow confirmation of the mathematical model established by the codes and refinement and improvement of the model.

It will now be understood that the present invention is unique in its approach to the development and construction of excimer lamps. Most of the world-wide research on excimer lamps is for VUV to UV photon generation for chemical processes. At least two approaches are known to have been used in the other development efforts.

First, the excimer fluorescence is created by a barrier discharge as reported by the following: Eliasson, B., Hirth, M., and Kogelschatz, U., J. Phys. D., *Appl. Phys.* 20, 1421–1437 (1987);

Eliasson, B., Kogelschatz, U., *Appl. Phys. B*, 46, 299–303 (1988a);

Eliasson, B., Kogelschatz, U., and Stein, H. J., at ASEA Brown Boveri [*EPA Newsletter*, NO 32, 29–40 (March 1988b);

Eliasson, B., Kogelschatz, U., *Dielectric-Barrier Discharges as an Efficient Source of UV and VUV Excimer Radiation*, IX International Conference on Gas Discharges and Their Applications, Venezia, Italy (Sep. 19–23, 1988c);

Eliasson, B., and Kogelschatz, U., *The Silent Discharge and its Applications to Ozone and Excimer Formation*, NATO Advanced Study Institute, Non-Equilibrium Processes in Partially Ionized Gases, Maratea, Italy (Jun. 4–17, 1989);

Eliasson, B., and Kogelschatz, U., *2nd Int. Conference on U.V.+Ozone in the Treatment of Water and Other Liquids* (Wasser Berlin '89), Berlin (Apr. 10–12, 1989);

Gellert, B., Eliasson, B., and Kogelschatz, U., $Rg_2^*$ and $RgCl^*$ *Excimer Emission from Dielectric Barrier Discharges*, 5th Int. Symp. on the Science & Technol. of Light Sources, York, Great Briton (September 1989a);

Gellert, B., Eliasson, B., and Kogelschatz, U., *UV Radiation from Hg Resonance Lines by Means of Dielectric Barrier Discharges*, 5th Int. Symp. on the Science & Technol. of Light Sources, York, Great Briton (September 1989b); and Esrom, H., Demny, J., and Kogelschatz, U., *Proc. 7th Europe. Conf. on Chemical Vapor Depositing*, (Perpipgnan, France), J. Phys. (France) 50, C5-719 to C5-725 (1989).

The second approach uses a microwave discharge to create excimer fluorescence as reported by:

Kumagai, H., and Obara, M., *Appl. Phys. Lett.* 54, 2619 (1989); and

Offermanns, S., *J. Appl. Phys.* 67(1), 115 (1990).

Until now, the development of high power excimer lamps has focused on two types of excitation mechanism, that is, microwaves, and microchannel discharges.

Those skilled in the art will know of the work to develop microwave excited lamps with rare gas halide excimers by Kumagai, H. and Obara, M. at Keio University, Yokohama, Japan, and *New High-Efficiency Quasi-Continuous Operation of a KrF(B→X) Excimer Lamp Excited by Microwave Discharge*, Appl. Phys. Lett. 54(26), 2619–1621 (1989).

Work has been done on microchannel discharges to drive rare gas and rare gas-halide quasi-CW lamps and reported by Eliasson, B., Kogelschatz, U., and Stein, H. J., at ASEA Brown Boveri [*EPA Newsletter*, NO 32, 29–40 (March, 1988b).

As is now understood, the lamp of the present invention is unique in the lamp is the combination of a discharge cell incorporating optical concentration capabilities to provide a high intensity excimer discharge.

From the foregoing description, those skilled in the art will appreciate that all of the objects of the present invention are realized. A solid-state laser and, more particularly, a microwave-driven (MWD) UV solid-state laser has been shown and described for providing the desired excimer fluorescence for a laser media.

The laser media of interest are the vibronic laser crystals which have $\omega_1$ tunability ranges as large as 700–1100 nm, as found in Ti:Sapphire; $\omega_2$, or frequency doubled tunability ranges as large as 350–550 nm; and $\omega_3$, or frequency tripled tunability ranges as large as 233–367 nm. A pump photon source was developed and is describe above which produces photons that overlap with the absorption bandwidth of the vibronic crystals. These excimer lamps are driven by microwave energy.

It has further been shown that the microwave driven excimer lamps themselves provide a highly efficient UV light source for use in other applications. Further, these source can produce light in ranges from vacuum UV through UV and into the visible range to allow a broad range of applications including greenhouse farming, chemical and/or hazardous waste destruction, UV sterilization, UV lithography, UV curing, photolysis, photo deposition, photoablation, isotope separation, and dye laser pumping.

While specific embodiments have been shown and described, many variations are possible. The particular shape and dimensions of the present invention may be changed as desired to suit the materials, excimers, laser crystals, energy requirements, and overall lamp design. The cavity and tube materials may vary depending upon engineering and performance requirements and restraints of either the excimer laser or the excimer lamp configuration. The laser related lamp and cell configuration may vary although the preferred embodiment shows two opposing lamps and an intermediate solid-state laser crystal.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A micro-wave driven UV light source, comprising:

a narrow-band visible excimer fluorescer;

a microwave resonance chamber, the microwave resonance chamber containing the narrow-band visible excimer fluorescer;

a microwave source for exciting the narrow-band visible excimer fluorescer, the microwave source coupled with the narrow-band visible excimer contained within the resonance chamber, the excited narrow-band visible excimer fluorescer providing an excimer fluorescence;

means for concentrating the excited excimer fluorescer onto an optically transparent aperture;

wherein the means for containing the narrow-band visible excimer fluorescer comprises:

a tubular chamber formed by a length of polished aluminum tubing, an opening provided through the chamber;

the chamber having a pair of opposed ends, one end sealed and another end screened and also covered with a window of a dielectric material, the sealed end providing a first aperture and a second aperture:

a polished aluminum sliding sheet welded to an aluminum tuning rod inserted through the first aperture and fixed in place;

a gas-fill valve inserted through the second aperture and sealed in place against leaking; and a magnetron and a microwave guide coupled to the chamber through the chamber opening.

2. A microwave-driven UV light source, comprising:

a narrow-band visible excimer fluorescer;

means for containing and guiding the narrow-band visible excimer fluorescer;

a chamber, the chamber receiving at least a portion of the containing and guiding means;

means for generating microwave energy for exciting the narrow-band visible excimer fluorescer located within the containing and guiding means located within the chamber, the excited narrow-band visible excimer fluorescer providing an excimer fluorescence when excited by microwave energy generated within the chamber means for concentrating the excited excimer fluorescer onto an optically transparent aperture;

tubular chamber framed by a length of polished aluminum tubing, an opening provided through the chamber;

the chamber having a pair of opposed ends, one end sealed and another end screened and also covered with a window of a dielectric material, the sealed end providing a first aperture and a second aperture;

a polished aluminum sliding sheet welded to an aluminum tuning rod inserted through the first aperture and fixed in place;

a gas-fill valve inserted through the second aperture and sealed in place against leaking; and a magnetron and a microwave guide coupled to the chamber through the chamber opening.

3. A light source as set forth in claim 2 wherein the narrow band fluorescer source is selected from a group including a Group I-I excimer photon source, a Group I-II excimer photon source, a Group II-II excimer photon source, a Group III-II exciter photon source, and a rare gas oxide excimer photon source.

4. A light source as set forth in claim 3 wherein the narrow band fluorescer source has an emission wavelength from approximately 400 nm to approximately 700 nm, inclusive.

5. A light source as set forth in claim 2 wherein the microwave energy is coupled to the chamber by a wave guide.

6. A light source as set forth in claim 2 wherein the visible excimer fluorescer is selected from a group including XeO vapor, Na vapor, Li vapor, Rb vapor, K vapor, NaHg vapor, KHg vapor, TlHG vapor, Hg vapor, KrO vapor, NeF, $Ar_2$, $Kr_2$, $F_2$, $Xe_2$, ArCl, KrI, ArF, KrBr, KrCl, KrF, XeI, $C_{12}$, XeBr, $Br_2$, XeCl, $I_2$, XcF, $Kr_2F$, HgI, HgBr, ArO, HgCl, CdI, $Cs_2$ and CdBr.

7. A light source as set forth in claim 2 wherein the means for containing and guiding the narrow-band visible excimer fluorescer is a microwave transparent, dielectric tube.

8. A light source as set forth in claim 7 wherein a dielectric substantially coats the microwave transparent, dielectric tube outer or inner surface.

9. A light source set forth in claim 8 wherein the dielectric has an index of refraction equal to or less than the microwave transparent, dielectric tube index of refraction.

10. A light source as set forth in claim 7 wherein the microwave transparent, dielectric tube is substantially conical.

11. A light source as set forth in claim 10 wherein the dielectric is composed of a plurality of layers of dielectric material.

12. A light source as set forth in claim 10 wherein the dielectric comprises a reflective metal coating.

13. A light source as set forth in claim 2 wherein the chamber is manufactured of a conductor and provides the resonating chamber associated with the microwave energy generating means.

14. A light source as set forth in claim 2 wherein the microwave energy generating means is a microwave source between approximately 0.5 GHz and approximately 240 GHz, inclusive.

15. A light source as set forth in claim 2 wherein the microwave energy is coupled to the chamber by aperture coupling.

* * * * *